Sept. 6, 1966 S. R. OVSHINSKY 3,271,591

SYMMETRICAL CURRENT CONTROLLING DEVICE

Filed Sept. 20, 1963

4 Sheets-Sheet 1

INVENTOR.

Stanford R. Ovshinsky

BY

Wallenstein, Spangenberg & Hattis

Attys.

Inventor
Stanford R. Ovshinsky
By: Wallenstein, Spangenberg & Hattis

INVENTOR.
Stanford R. Ovshinsky
BY Wallenstein, Spangenberg + Hattis
Att'ys

Inventor
Stanford R. Ovshinsky
By: Wallenstein, Spangenberg and Hattis
Attys.

United States Patent Office 3,271,591

Patented Sept. 6, 1966

3,271,591

SYMMETRICAL CURRENT CONTROLLING DEVICE

Stanford R. Ovshinsky, Birmingham, Mich., assignor, by mesne assignments, to Energy Conversion Devices, Inc., Troy, Mich., a corporation of Delaware Filed Sept. 20, 1963, Ser. No. 310,407
33 Claims. (Cl. 307—88.5)

This invention has to do with solid state current controlling devices for electrical circuits and this application is a continuation-in-part of my copending applications Ser. No. 118,642, filed June 21, 1961, now abandoned; Ser. No. 226,843, filed September 28, 1962; Ser. No. 252,510, filed January 18, 1963; Ser. No. 252,511, filed January 18, 1963; Ser. No. 252,467, filed January 18, 1963; and Ser. No. 288,241, filed June 17, 1963, now abandoned.

The principal object of this invention is to provide a solid state current controlling device for an electrical load circuit which operates as a "switching" device for substantially instantaneously "closing" and "opening" the electrical load circuit, which is particularly adaptable for "closing" and "opening" A.C. electrical load circuits although it is also readily adaptable for "closing" and "opening" D.C. electrical load circuits, and which is capable of "closing" and "opening" high energy electrical load circuits including load ranges up to 250 watts and beyond, voltage ranges up to 220 volts and beyond and ampere ranges up to 10 amperes and beyond by means of the imposition of electrical fields thereon through comparatively low energy control signals.

The solid state current controlling or switching device of this invention includes a solid state semiconductor material means along with means, such as electrodes, nonrectifying contact therewith for connecting the same in series in the electrical load circuit. The solid state semi-conductor material, in one state or condition, is of high resistance and substantially an insulator for blocking the flow of current therethrough in either or both directions and, in another state or condition, it is of low resistance and substantially a conductor for conducting the flow of current therethrough in either or both directions. In its blocking state or condition, the solid state semiconductor material may have resistance values of millions of ohms while, in its conducting state or condition, the same configuration may have resistance values of less than one ohm, thereby providing current blocking substantially as in a high dielectric insulator and providing current conduction substantially as in a high current conducting metal.

The characteristics of the solid state semiconductor material of this invention are such that it may be substantially instantaneously changed from its blocking state or condition to its conducting state or condition and from its conducting state or condition to its blocking state or condition upon the imposition of selected electrical fields thereon. The solid state semiconductor material of this invention, in its blocking state or condition, blocks the current flow in each direction, i.e. in either direction or alternately in both directions substantially equally and, also, in its conducting state or condition, conducts the current flow in each direction, i.e. in either direction or alternately in both directions substantially equally, and, accordingly, it is admirably suited for "switching" A.C. electrical load circuits. It is also suitable for "switching" D.C. electrical load circuits.

When the solid state semiconductor material of this invention is in its blocking state or condition and is subjected to one kind of electrical field of at least a threshold value, as for example, an applied electromotive force or voltage above a threshold value, it is substantially instantaneously changed from its blocking state or condition to its conducting state or condition. The applied voltage may be an A.C. voltage or a D.C. voltage applied in either direction. The solid state semiconductor material in certain instances has memory and will remain in its conducting state or condition even through the applied voltage is decreased below the threshold value. Two general types of current controlling devices are here involved, one which remains in its conducting state or condition without the need for a holding current, which requires a different signal to change it to its blocking state or condition and which is referred to as a memory device, and the other which requires a holding current for maintaining it in its conducting state or condition, which changes to its blocking state or condition when the current decreases below a minimum holding current value and which is referred to as a device without memory. The term "applied voltage" as used herein is the voltage applied to the load circuit containing the solid state semiconductor devices of this invention.

When certain of the solid state semiconductor devices of this invention are placed in their conducting state by the application of a D.C. voltage, the memory is complete and long lasting and these devices will remain in their conducting state even though the applied voltage is greatly reduced below the threshold value or removed entirely or reversed. These devices may be substantially instantaneously changed from their conducting state to their blocking state by the imposition of a different kind of electrical field thereon, they have memory of their blocking state and remaining in their blocking state even though this different kind of electrical field is only momentarily applied. Some of these devices may be changed from their conducting state to their blocking state by applying a voltage or current thereto, and others by applying a current pulse thereto or by applying an A.C. current produced by an A.C. voltage above the threshold value and thereafter reducing the A.C. voltage. They may be substantially instantaneously again changed from their blocking state to their conducting state by the imposition of the aforementioned one kind of electrical field (the applied D.C. voltage) above the threshold value. Thus, these devices, having these controllable alternate conducting and blocking memory states, are admirably suitable for memory devices for use as read-in and read-out devices in computers and the like, and this is especially so since they can directly switch high energy electrical load circuits and eliminate the need for low energy electrical circuits and related amplifiers as are now required. Some of these solid state semi-conductor devices with memory may also be placed in their permanent conducting state by the application of an A.C. voltage above a threshold value, and these alternate conducting and blocking memory devices are referred to hereinafter for convenience as Hi-Lo and Circuit Breaker devices which differ from each other in the kinds of the electrical fields imposed thereon for substantially instantaneously changing them from their conducting to their blocking states.

The Hi-Lo device may be changed from its blocking state to its conducting state by the application of an A.C. voltage of at least a threshold value and remains in its conducting state at voltages below the threshold value. When the Hi-Lo device is in its conducting state and the applied A.C. voltage is below the threshold value, the impostion of an electrical field on the device, such as a small D.C. or A.C. voltage applied through a low resistance to provide high current, instantaneously changes the device from its conducting state to its blocking state where it remains until it is again substantially instantaneously changed to its conducting state by increasing the applied A.C. voltage to at least its threshold value. The applied small D.C. or A.C. voltage and high current need only be momentarily applied.

Likewise, the Circuit Breaker device may be changed from its blocking state to its conducting state by the application of an A.C. voltage of at least a threshold value and it remembers and remains in its conducting state at voltages below the threshold value. It is normally used in its conducting state at A.C. voltages below the threshold value, and upon the imposition of an electric field, such as an increase of current flow therethrough by reason of decreasing the effective load resistance below a critical value either rapidly or slowly, the device instantaneously changes from its conducting state to its blocking state where it remains until it is again substantially instantaneously changed to its conducting state by increasing the applied A.C. voltage to at least its threshold value. The increase of current flow needs to be only momentary for changing the device from its conducting state to its blocking state. This Circuit Breaker device may also be operated as a Hi-Lo device if desired.

Another form of the solid state semiconductor device of this invention, which is hereinafter referred to for convenience as a Mechanism device with memory, is not ordinarily capable of being placed in a permanent conducting state by the application of an A.C. voltage above a threshold value, but, instead, it is changed from its blocking state to its permanent conducting state by the application of a D.C. voltage above a threshold value, it remembering and remaining in its conducting state even through the applied D.C. voltage is reduced below the threshold value or is removed entirely or is reversed, as discussed above. However, if the applied D.C. voltage is high, and the high D.C. voltage is suddenly removed or reduced, the Mechanism device with memory will switch to its blocking state. Further, the Mechanism device with memory, which has been placed in its permanent conducting state by the application of a D.C. voltage, may be changed from its permanent conducting state to its blocking state by the imposition of an electric field, such as a current pulse or an A.C. current provided by an A.C. voltage above an upper threshold value as determined by the load resistance and thereafter reducing the A.C. voltage. If the applied A.C. voltage is above the upper threshold value the Mechanism device with memory assumes a modified conducting state wherein current conduction is momentarily interrupted near the zero points of the applied A.C. voltage, and when the applied A.C. voltage is lowered below a lower threshold value, the Mechanism device with memory immediately changes to its blocking state, it remembering and remaining in that state even though the A.C. voltage is removed. The Mechanism device with memory may again be changed to its permanent conducting state by applying a D.C. voltage of at least a threshold value. The Mechanism device with memory may also be changed to its permanent conducting state by connecting it in a circuit having a high series load resistance and applying an A.C. voltage above a lower threshold value. When the applied A.C. voltage is reduced or removed, the device will remain in its conducting state. It may be changed to its blocking state by applying an A.C. current from an A.C. voltage above an upper threshold value as determined by the load resistance and then decreasing the A.C. voltage below the lower threshold value.

The Mechanism device without memory is normally in a blocking state and always tends to go to the blocking state, but, as in the other devices, it is substantially instantaneously changed from its blocking state or condition to its conducting state or condition by the application of an A.C. or D.C. voltage of at least an upper threshold value. However, it only remembers and remains in its conducting state until the applied voltage is decreased to a value providing a minimum holding current value, and when the current is decreased below such minimum holding value, it substantially instantaneously or immediately changes from its conducting state or condition to its blocking state or condition. The conducting state or condition of the Mechanism device with or without memory, when brought about by the application of an A.C. voltage above an upper threshold value, is a somewhat modified conducting state wherein the current conduction is momentarily interrupted near the zero points of the applied A.C. voltage where the instantaneous current is decreased below the minimum holding current value, and the length of each such momentary interruption may be dependent upon the value of the applied A.C. voltage. When the applied A.C. voltage is decreased to a lower threshold value, the modified current conduction is interrupted and the device remains in its blocking state or condition. When the Mechanism device is conducting between its upper and lower A.C. voltage threshold values, the average current flow may be modulated by modulating the applied A.C. voltage between said threshold values. Also, as the frequency of the applied A.C. voltage is decreased, the Mechanism device tends to remain in its conducting state or condition and the lower threshold value of the applied A.C. voltage, at which the Mechanism device changes from its conducting state or condition to its blocking state or condition, is correspondingly lowered.

If, when the applied A.C. voltage applied to the conducting Mechanism device with memory is between the upper and lower threshold values, a D.C. bias voltage is also applied, the resistance value or state of the Mechanism device in its conducting state or condition is increased in accordance with the amount of D.C. bias. When the A.C. voltage and the D.C. bias are removed, the Mechanism device has memory of that resistance value and remains in that resistance state. It has also been found that, when the Mechanism device is in its modified conducting state or condition by reason of the application of an A.C. voltage thereto, and when the series load resistance in the load circuit is increased substantially to decrease substantially the current flow through the device, the device tends to become a full conductor and remain substantially indefinitely in its conducting state as though it had been made conducting by the application of a D.C. voltage thereto. It has further been found that a Mechanism device in its modified conducting state or condition by reason of the application of an A.C. voltage thereto, will continue to conduct A.C. current with interruptions as the instantaneous A.C. current in its alternating cycle nears its zero point until the applied A.C. voltage is decreased below its lower threshold value.

Thus, all of the solid state semiconductor electrical control devices of this invention may be substantially instantaneously changed from their blocking states or conditions to their conducting states or conditions by imposing one electrical field thereon, and they may be substantially instantaneously changed from their conducting states or conditions to their blocking states or conditions by imposing an electrical field thereon. As expressed above, the imposed electrical field for substantially instantaneously changing all of the devices from their blocking states or conditions to their conducting states or conditions may be an applied voltage of at least threshold value. The imposed electrical field for substantially instantaneously changing the Hi-Lo device from its conducting state to its blocking state may be the imposition of a small D.C. or A.C. voltage through a low resistance to provide high current. The imposed electrical field for substantially instantaneously changing the Circuit Breaker device from its conducting state to its blocking state may be an increase in current flow caused by a decrease in the load resistance below a critical value. The imposed electrical field for substantially instantaneously changing the Mechanism device from its conducting state to its blocking state may be, in one instance, the application of a current pulse or an A.C. current and, in the other instance, the decreasing of the applied A.C. voltage to a value insufficient to provide a minimum holding current. It is believed that the reversible changes between the blocking and conducting states or conditions are caused by changes in the internal thermodynamic conditions in the devices (e.g. temperature, electric potential, chemical composition and/or phase). The semiconductor materials of the devices which remain in their low resistance or conducting state or condition without the need for a holding current (such as the Hi-Lo and Circuit Breaker devices and the Mechanism device with memory for D.C. operation) are referred to herein as memory type semiconductor materials, while the semiconductor materials of the devices which require a holding current to maintain the same in their low resistance or conducting state or condition (such as the Mechanism device without memory and the Mechanism device with memory for A.C. operation) are referred to herein as mechanism type semiconductor materials. The foregoing electrical characteristics and switching functions may be afforded by many different semiconductor materials and, particularly in connection with the devices without memory, the switching functions are not critically dependent upon the condition of the semiconductor materials, the switching functions occurring in semiconductor materials which are crystalline, or amorphous which may even be liquid. Some examples of the semiconductor materials are set forth hereafter.

It has also been discovered that increasing the applied voltage above the threshold value operates to decrease still further the conducting resistance of the solid state semiconductor devices of this invention, and that increasing the applied D.C. or A.C. voltage or current in the Hi-Lo device and increasing the current flow in the Circuit Breaker device, above those required to change such devices from their conducting states to their blocking states, increase still further the blocking resistances of said devices. In this way, the conducting and blocking resistance values of the devices may, within limits, be regulated and predetermined.

The solid state semiconductor conrolling devices of this invention have a temperature-resistance coefficient, the blocking resistance values and the applied voltage threshold values for switching the devices from their blocking states to their conducting states increasing as the temperature of the devices is decreased. For example, a device of this invention having a blocking resistance of substantially 300,000 ohms at room temperature has a blocking resistance of substantially 500,000,000 ohms at the temperature of liquid nitrogen. Thus, the blocking resistance values and the applied voltage threshold values can be utilized as indications of the temperature of the devices (the higher the temperature of the devices the lower the threshold values) and these values may also be predetermined or selected by regulating the temperature of the devices, the devices being capable of being switched by the application of external heat thereto and thereby being particularly advantageous for transducer applications of the device. However, the usual changes in the usual temperature conditions normally encountered in the ordinary switching applications and environments may have substantially no effect upon the above-described operations of the solid state semiconductor devices of this invention which are particularly adapted for use at such usual temperature conditions.

These imposed electrical fields for so controlling the aforementioned solid state semiconductor electrical control devices for substantially instantaneously "switching" high energy electrical load circuits, including A.C. electrical load circuits, between "on" and "off" conditions may be readily and easily controlled. The imposition of these electrical fields and the manner of controlling the same also constitute important discoveries, aspects and objects of this invention.

Since the "switching" of high energy A.C. electrical load circuits is of great importance and has not heretofore been successfully accomplished by single layer solid state semiconductor devices as distinguished from multilayer diodes having p-n junctions, the description hereinafter will be directed principally to such A.C. operations, although it will be understood that generally corresponding operations may also be applied to high energy D.C. electrical load circuits and low energy A.C. and D.C. electrical load circuits.

Heretofore, solid state semiconductor electrical control devices have been generally of the type for controlling D.C. electrical circuits or for providing rectification of A.C. current, they all being essentially D.C. electrical circuit and rectifying components. The efforts in the semiconductor art have been directed largely and principally to providing substantially pure semiconductor materials (in some cases with small measured amounts of doping impurities) for such D.C. electrical circuit and rectifying components. Also great efforts have been expended toward eliminating, or reducing to a minimum, changes in structure of the semiconductor materials, and defects or recombination centers or traps, particularly with respect to such defects or recombination centers or traps at the surfaces or interfaces of the semiconductor devices, for they have exhibited serious and detrimental effects upon such semiconductor devices.

However, in accordance with the instant invention, particularly where amorphous or amorphous-crystalline semiconductor materials are utilized, it has been discovered that solid state semiconductor devices which may change in structure, which are immensely impure and which, particularly in the high resistance or blocking state, have great numbers of defects or recombination centers or traps (hereinafter collectively referred to as current carrier restraining centers) with respect to the current carriers, in the bulk and at the surfaces or interfaces thereof, have the above described electrical characteristics and are capable of "switching" high energy electrical load circuits, including A.C. electrical load circuits, between "on" and "off" conditions in the manners described above. It is believed that such changes in structure and impurities or defects or recombination centers or traps and the current carriers in the solid state semiconductor materials of this invention are affected by the aforementioned electrical fields imposed thereon for providing the electrical characteristics and manners of operation described above, which were not provided by the heretofore known solid state semiconductor devices used for D.C. electrical circuit and rectifying components. Where crystalline semiconductor materials are utilized in the devices without memory, it may be necessary to give consideration to purities in order to achieve high resistance in the blocking state or condition. Here, as in the case of the devices utilizing amorphous materials, it is necessary to prevent rectifying barrier and p-n junction formation. Such discovery and concept further constitute important aspects and objects of this invention.

By utilizing selected solid state semiconductor materials, which may change in structure and which have the desired electrical characteristics may be regulated and predetermined, as for example, the type of device, such as Hi-Lo, Circuit Breaker or Mechanism, the electrical resistance values of the solid state semiconductor devices in their blocking states or conditions and in their conducting states or conditions, the current blocking and current conducting capacities of the devices, the threshold value of the electrical field at which the devices substantially instantaneously change from their blocking state or condition to their conducting state or condition, the value of the imposed electrical field required to substantially instantaneously change the Hi-Lo device from its conducting state or condition to its blocking state or condition, the value of the imposed electrical field required to substantially instantaneously change the Circuit Breaker device from its conducting state or condition to its blocking state or condition, and the value of the electrical field at which the Mechanism device is substantially instantaneously changed from its conducting state or condition to its blocking state or condition.

For example, the solid state semiconductor materials can be tellurides, selenides, sulfides or oxides of substantially any metal, or metalloid, or intermetallic compound, or semiconductor, or solid solutions or mixtures thereof, particularly good results being obtained where tellurium or selenium are utilized. These solid state semiconductor materials are appropriately selected and may be appropriately treated to provide desired restraining centers with respect to current carriers, and some specific examples will be set forth hereafter. The solid state semiconductor materials of this invention are non-rectifying and may be of the p-type or n-type.

The solid state semiconductor materials may be chosen to provide an intramolecular band structure having large numbers of current carrier restraining centers by virtue of disordered chain or ring structure or disordered atomic structure and this may be enhanced by treating the same in various ways, as for example, utilizing impure materials; depositing on substrates; adding impurities; including oxides in the bulk and/or in the surfaces or interfaces; mechanically by machining, sand blasting, impacting, bending, etching or subjecting to ultrasonic waves; metallurgically forming physical lattice deformations by heat treating and quick quenching or by high energy radiation with alpha, beta or gamma rays; chemically by means of oxygen, nitric or hydrofluoric acid, chlorine, sulphur, carbon, gold, nickel, iron or maganese inclusions, or ionic composition inclusions comprising alkali or alkaline earth metal compositions; electrically by electrical pulsing; or combinations thereof.

The solid state semiconductor materials of this invention may be in the form of a body, a thin wafer or layer or film and may perform their current controlling functions in the bulk or in the surfaces or interfaces or in the combinations thereof, the most pronounced controlling activity normally being afforded in the surfaces or interfaces. The surfaces may include a film which may contain oxides and the thickness of such body, thin wafer or layer or film may be within the range of substantially a monomolecular thickness up to a thickness of a few ten thousandths of an inch or even up to a thickness of a few hundredths of an inch or more. Electrically conducting electrodes are utilized for connecting the solid state semiconductor materials in series in the electrical load circuit and the path of current flow may be through the material including its interfaces or surfaces or films, or along the surfaces or films thereof. The nature and thicknesses of the semiconductor materials and their interfaces, surfaces and films, the spacing of the electrodes and the manner in which the electrodes are applied have an effect upon the end results, but the solid state semiconductor devices of this invention may be tailor made to fit almost any requirement.

Various different theories of operation of the heretofore known solid state semiconductor devices have been advanced but none of them appears to be sufficient to completely explain the operation of the solid state semiconductor devices of this invention. The particular theory or theories of operation of the solid state semiconductor devices of this invention are not certain, but various theories or postulations may be made in an attempt to further understand the subject matter of this invention.

As one example of possible thory, in accordance with this invention, there exists in the semiconductor material and the surfaces thereof and in the interfaces between the semiconductor material and the electrodes associated therewith, current carrier retaining centers or states or conditions which may operate under the control of electrical fields imposed thereon for restraining and releasing the current carriers.

In the solid state semiconductor devices of this invention, it is possible that the current carriers and their mobilities are so controlled by one electrical field that they remain in a free, almost metallic, condition or state of conduction, and that the free current carriers in the conducting state are so controlled in response to electrical fields as to reduce their availability and provide a semiconducting or a dielectric or blocking state which remains substantially indefinitely. It is also possible that there is a change in phase or state or condition of the semiconductor material in the bulk or immediately adjacent the electrodes which is exceptionally fast and extremely reversible, such as a change in phase or state between a crystalline condition where it is a conductor and an amorphous condition where it is an insulator, and/or a change in phase or state between a softened or molten or liquid condition where it is a conductor and a solid condition where it is an insulator, and/or a change in crystal structure and size and relations between crystals with respect to such changes in phase or state, semiconductor operation with current carriers and current carrier restraining centers probably being present in any or all of such phases or states or condition. It is possible that the semiconductor materials and their interfaces and surfaces, and particularly where oxides are involved, act to impose strong localized fields, and, under certain conditions, tunneling is quite possible. The impurities and defects and ions introduced into the materials and their surfaces and interfaces probably act as controllable restraining centers for the current carriers and also probably affect the space charge. It is also possible that the contacts between the semiconductor materials and the electrodes are essentially non-rectifying or ohmic contacts which conduct current in either or both directions without rectification, but which are capable upon the imposition of certain electrical fields to cause the electrodes to inject current carriers into the semiconductor materials or to sweep away the current carriers.

It may also be possible that a barrier height is established by charges at the interfaces between the semiconductor material and the metal electrodes associated therewith to provide the blocking state, and it is possible that an electrical gradient in the form of an electrical field, such as the applied voltage, acts as if to reduce the barrier by causing the separation of the current carriers from their recombination centers and provide the conducting state for substantially unimpeded current flow. It may be considered that in the conducting state the current carriers are being emitted and that the barrier is vanishingly thin. It may also be considered that the current carrier restraining centers are reactivated to recombine or trap or restrain the current carriers to reestablish the barrier and hence the blocking state.

Preferably, the semiconductor materials of the devices of this invention may be materials of the polymeric type including polymeric networks and the like having covalent bonding and cross-linking highly resistant to crystallization, which, in their high resistance or blocking state, are in a locally organized disordered solid state condition which is generally amorphous (not crystalline) but which may possibly contain relatively small crystals or chain or ring segments which would probably be maintained in randomly oriented position therein by the crosslinking. These polymeric structures may be one, two or three dimensional structures. It is believed that such generally amorphous polymeric like semiconductor materials have substantial current carrier restraining centers and a relatively large energy gap, that they have a relatively small mean free path for the current carriers, large spatial potential fluctuations and relatively few free current carriers due to the amorphous structure and the substantial current carrier restraining centers therein for providing the high resistance or blocking state or condition. In this respect, it is believed that such amorphous type of semiconductor materials may have a higher resistance at the ordinary and usual temperatures of use, a greater non-linear negative temperature-resistance coefficient, a lower heat conductivity coefficient, and a greater change in electrical conductivity between the blocking state or condition and the conducting state or condition than crystalline type of semiconductor materials, and thus be more suitable for many applications of this invention.

However, the semiconductor materials of the Mechanism devices without memory may be crystalline like materials in their high resistance or blocking state or condition having substantial current carrier restraining centers, and it is believed that such crystalline like semiconductor materials have a relatively large mean free path for the current carriers due to the crystal lattice structure and hence a relatively high current carrier mobility, but that there are relatively few free current carriers due to substantial current carrier restraining centers therein, a relatively large energy gap therein, and large spatial potential fluctuations therein for providing the high resistance or blocking state or condition.

As an electrical field is applied to the semiconductor material (either the crystalline type or the amorphous type) of a device of this invention in its blocking state or condition, such as a voltage applied to the electrodes, the resistance of at least portions or paths of the semiconductor material between the electrodes decreases gradually and slowly as the applied field increases until such time as the applied field or voltage increases to a threshold value, whereupon said at least portions of the semiconductor material, at least one path between the electrodes, are substantially instantaneously changed to a low resistance or conducting state or condition for conducting current therethrough. It is believed that the applied threshold field or voltage causes firing or breakdown or "switching" of said at least portions or paths of the semiconductor material, and that the breakdown may be electrical or thermal or a combination of both, the electrical breakdown caused by the electrical field or voltage being more pronounced where the distance between the electrodes is small, as small as a fraction of a micron or so, and the thermal breakdown caused by the electrical field or voltage being more pronounced for greater distances between the electrodes. For some crystalline like materials the distances between the electrodes can be so small that barrier rectification and p-n junction operation are impossible due to the distances being beneath the transition length or barrier height. The "switching" times for switching from the blocking state to the conducting state are extremely short, less than a few microseconds.

The electrical breakdown may be due to rapid release, multiplication and conduction of current carriers in avalanche fashion under the influence of the applied electrical field or voltage, which may result from external field emission, internal field emission, impact or collision ionization from current carrier restraining centers (traps, recombination centers or the like), impact or collision ionization from valence bands, much like that occurring at breakdown in a gaseous discharge tube, or by lowering the height or decreasing the width of possible potential barriers and tunneling or the like may also be possible. It is believed that the local organization of the atoms and their spatial relationship in the crystal lattices in the crystalline type materials and the local organization and the spatial relationship between the atoms or small crystals or chain or ring segments in the amorphous type materials, at breakdown, are such as to provide at least a minimum mean free path for the current carriers released by the electrical field or voltage which is sufficient to allow adequate acceleration of the free current carriers by the applied electrical field or voltage to provide the impact or collision ionization and electrical breakdown. It is also believed that such a minimum mean free path for the current carriers may be inherently present in the amorphous structure and that the current conducting condition is greatly dependent upon the local organization for both the amorphous and crystalline conditions. As expressed above a relatively large mean free path for the current carriers can be present in the crystalline structure.

The thermal breakdown may be due to Joule heating of said at least portions or paths of the semiconductor material by the applied electrical field or voltage, the semiconductor material having a substantial non-linear negative temperature-resistance coefficient and a minimal heat conductivity coefficient, and the resistance of said at least portions or paths of the semiconductor material rapidly decreasing upon such heating thereof. In this respect, it is believed that such decrease in resistance increases the current and rapidly heats by Joule heating said at least portions or paths of the semiconductor material to thermally release the current carriers to be accelerated in the mean free path by the applied electrical field or voltage to provide for rapid release, multiplication and conduction of current carriers in avalanche fashion and, hence, breakdown, and, especially in the amorphous condition, the overlapping of orbitals by virtue of the type of local organization can create different subbands in the band structure.

It is also believed that the current so initiated between the electrodes at breakdown (electrically, thermally or both) causes at least portions or paths of the semiconductor material between the electrodes to be substantially instantaneously heated by Joule heat, that at such increased temperatures and under the influence of the electrical field or voltage, further current carriers are released, multiplied and conducted in avalanche fashion to provide high current density, and a low resistance or conducting state or condition which remains at a greatly reduced applied voltage. It is possible that the increase in mobility of the current carriers at higher temperature and higher electric field strength is due to the fact that the current carriers being excited to higher energy states populate bands of lower effective mass and, hence, higher mobility than at lower temperatures and electric field strengths. The possibility for tunneling increases with lower effective mass and higher mobility. It is also possible that a space charge can be established due to the possibility of the current carriers having different masses and mobilities and since an inhomogeneous electric field could be established which would continuously elevate current carriers from one mobility to another in a regenerative fashion. As the current densities of the devices decrease, the current carrier mobilities decrease and, therefore, their capture possibilities increase. In the conducting state or condition the current carriers would be more energetic than their surroundings and would be considered as being hot. It is not clear at what point the minority carriers present could have an influence on the conducting process, but there is a possibility that they may enter and dominate, i.e. become majority carriers at certain critical levels.

It is further believed that the amount of increase in the mean free path for the current carriers in the amorphous like semiconductor material and the increased current carrier mobility are dependent upon the amount of increase in temperature and field strength, and it is possible that said at least portions or paths of some of the amorphous like semiconductor materials are electrically activated and heated to at least a critical transition temperature, such as a glass transition temperature, where softening begins to take place. Thus, due to such increase in mean free path for the current carriers, the current carriers produced and released by the applied electrical field or voltage are rapidly released, multiplied and conducted in avalanche fashion under the influence of the applied electrical field or voltage to provide and maintain a low resistance or conducting state or condition. Furthermore, the current conducting filaments or threads or paths may increase or decrease in cross section or volume depending upon the current density and, therefore, the current conduction can vary at substantially constant voltages, and there is no substantial overall generation of heat in the devices.

With respect to the memory devices, such as the Hi-Lo, Circuit Breaker and Mechanism device with memory it is believed that in switching to the conducting state said at least portions or paths of the semiconductor ma erial are electrically activiated and heated by Joule heat to at least a critical transition temperature, such as a glass transition temperature where softening begins to take place, and that at such elevated temperatures crystallization takes place in said at least portions of the semiconductor material and they assume a static condition, i.e., a more ordered polymeric like crystalline solid state condition which possibly may contain relatively large crystals or packed chains or rings or a condition approaching the more ordered polymeric like crystalline condition which possibly may contain relatively large alignment of the chain or ring segments. Both of these are herein termed the more ordered crystalline structure and both of these are frozen in to provide the low resistance or conducting state having memory of this condition even after the applied electrical field or voltage is decreased or removed or reversed in polarity. The chain or ring segments may be actuated to the disordered or amorphous condition by the application of a different electrical field.

In connection with the memory devices, such as the Hi-Lo, Circuit Breaker and Mechanism devices with memory, in their low resistance or conducting state, said at least portions or paths of the memory type semiconductor material (threads or filaments or paths) having said more ordered crystalline like solid state condition are closely enclosed or encased in the remaining solid state semiconductor material having the aforementioned disordered polymeric like solid state condition which has relatively high electrical resistance and relatively low heat conductivity. When electrical energy is applied to the electrodes through a relatively low impedance, a large current flow of at least a threshold value is caused to flow through said at least portions or paths of the solid state semiconductor material to generate, by Joule heat, substantial heat therein, dissipation of heat therefrom being held to a minimum by the immediately surrounding material having the disordered polymeric like structure. It is believed that said at least portions or paths of the semiconductor material are heated above the aforementioned critical transition temperature and that such heating causes a substantial sharp temperature differential between the ordered crystalline structure of said portions or paths and the immediately enclosing or encasing disordered amorphous structure. As a result, it is believed that the relatively large crystals or packed chains or rings of the ordered crystalline structure of said at least portions or paths of the semiconductor material are so thermally vibrated and shocked or stressed to break them up into relatively small crystals or chain or ring segments (to decrease the crystallization forces with respect to the crystal inhibiting forces) and form the highly disordered amorphous structure to provide the high resistance or blocking state therein. In this respect, it is believed that when a crystal or chain or ring in said at least portions or paths of the semiconductor material are so ruptured or broken, the electrical energy is caused to flow through the remaining crystals or chains or rings to additionally heat them so that the rupturing or breaking of the crystals or chains or rings takes place in avalanche fashion and substantially instantaneously causes said at least portions of the semiconductor material to return to its high resistance or blocking condition.

It is also possible when said at least portions or paths of the semiconductor material are so activated and heated by the high current that they are heated to a softened or molten condition, that the current path therethrough is interrupted at a point therein to block the flow of current therethrough, and that as a result of such interruption of the current flow said at least portions or paths of the semiconductor material rapidly cool and assume the highly disordered amorphous state. Said at least portions or paths of the semiconductor material may also be rapidly cooled by externally interrupting or rapidly decreasing the high current therethrough. It is believed that it is in these ways that the Hi-Lo, Circuit Breaker and Mechanism devices with memory are switched from their conducting state or condition to their blocking state or condition. The switching between the conducting and blocking states or conditions is reversible and long lasting.

In the memory devices, the low resistance or conducting state, which is a static crystalline like condition, remains after the applied electrical field or voltage is decreased or removed, while in the Mechanism devices, the low resistance or conducting state exists only while a sustaining electrical field or voltage is applied.

It is believed that in the amorphous type semiconductor materials of this invention there are always present crystal inhibiting or disrupting forces (crosslinking and the like in the polymeric structure) which always tend to cause the semiconductor materials to assume their highly disordered or generally amorphous solid state condition and that, upon being activated by the applied threshold field or voltage and heating said at least portions or paths of the semiconductor materials, the crystal inhibiting or disrupting forces are decreased and crystallization forces are brought into play which tend to cause said at least portions or paths of the semiconductor materials to assume their more ordered crystalline like solid state condition. Whether or not said at least portions or paths of the semiconductor materials change to and remain in their more ordered or crystalline like solid state condition or remain in their disordered or generally amorphous solid state condition (although in a dynamically more ordered solid state condition), depends, it is believed, upon the relative strengths of the crystal inhibiting or disrupting forces and the crystallization forces. The Mechanism devices without memory and using amorphous materials always remain in the disordered or generally amorphous condition. In the memory devices where the crystallization forces are sufficiently strong to cause said at least portions or paths of the semiconductor materials to change to and remain in their more ordered crystalline like condition, these crystallization forces may be controlled and decreased sufficiently to allow the ever present crystal inhibiting or disrupting forces to return said at least portions or paths of the semiconductor materials to their disordered or generally amorphous solid state condition.

When said at least portions or paths of the memory type semiconductor materials, such as used in the Hi-Lo, Circuit Breaker and Mechanism devices having memory, are in their low resistance or conducting state, i.e. their more ordered crystalline like solid state condition, at elevated temperature and are cooled by decrease in the applied electrical energy below the aforementioned critical transition temperature, they remain in this state of condition, and they have substantially permanent memory of this state or condition. It is believed that these semicondutcor materials have relatively weak crystal inhibiting or disrupting forces (a lesser amount of crosslinking in the polymeric structure) with respect to the crystallization forces. Conversely, when said at least portions or paths of the mechanism type semiconductor materials, such as used in the Mechanism devices without memory, are in their low resistance or conducting state, i.e. their dynamically more ordered solid state condition, and even where they may be at a temperature above the aforementioned critical transition temperature, they automatically substantially instantaneously revert, upon substantial reduction of the current below a certain holding value, to their high resistance or blocking state, i.e. their disordered or generally amorphous solid state condition, toward they always tend to revert. It is believed that these semiconductor materials have relatively strong crystal inhibiting or disrupting forces (a greater amount of crosslinking in the polymeric structure) with respect to the crystallization forces.

The solid state semiconductor current controlling devices of this invention may take various forms and may be of two, three or four electrode types depending upon the type of service in which they are utilized. If the devices are to be subjected to adverse atmospheric conditions or rough handling, they may be suitably encapsulated. Encapsulation presents no real problem since the devices are substantially insulators in their blocking states, are substantially conductors in their conducting states, and are substantially instantaneously switched between their blocking and conducting states.

Other objects and advantages of this invention will become apparent to those skilled in the art upon reference to the accompanying specification, claims and drawings in which:

FIGS. 1 to 17 diagrammatically illustrate various forms of the solid state current controlling device of this invention;

Figures 1, 2, 3, 4, 5, 6, 7, 8, 9, 10, 11, 12, 13, 14, 15, 16, 17:
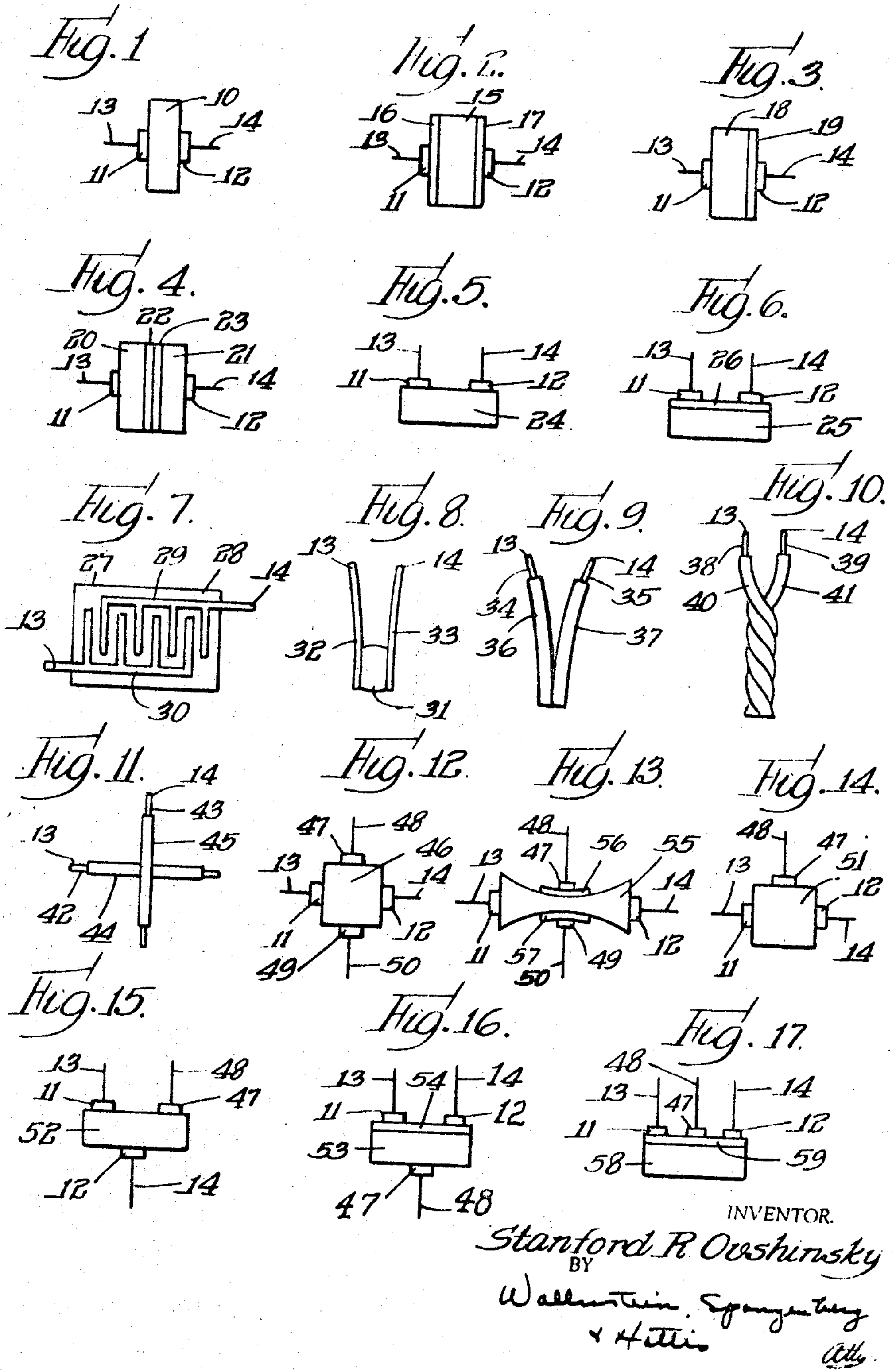

A solid state current controlling device of this invention is diagrammatically illustrated in FIG. 1 and it includes a body 10 of solid state semiconductor material, a pair of electrically conducting electrodes 11 and 12 in electrical contact with the solid state semiconductor body 10 and a pair of leads 13 and 14 for connecting the device in series in an electrical load circuit. The electrodes 11 and 12 may be embedded in the body 10 or they may be suitably applied and secured to the surface of the body 10. Here, the current flow is through the solid state semiconductor body 10 and the control of the current is accomplished principally in bulk in the body 10, the effective material between the electrodes normally being in its blocking state.

In the solid state current controlling device of FIG. 2, a body 15 of solid state semiconductor material has surfaces or films 16 and 17 to which are applied the electrodes 11 and 12 having leads 13 and 14 for connecting the solid state current controlling device into the electrical load circuit. Here, the current flow is through the body 15 and the surfaces or films 16 and 17 and the control of the current flow takes place principally in the surfaces or films 16 and 17, the material of the body being in its conducting state and the material of the surfaces or films being in its blocking state.

In FIG. 3, the solid state current controlling device includes a solid state semiconductor body 18 with a single surface or film 19, the electrode 11 being in electrical contact with the body 18 and the electrode 12 being in electrical contact with the film or surface 19. The leads 13 and 14 operate to connect the device into the electrical load circuit. The current flow is through the body 18 and the surface or film 19 and the control of the current takes place principally in the surface or film 19, the material of the body being in its conducting state and the material of the surface or film normally being in its blocking state. The electrode 11 may be embedded in the body 18 or applied to the surface thereof and the electrode 12 is applied to the surface or film 19.

In FIG. 4, the current controlling device includes a pair of solid state semiconductor bodies 20 and 21 which are provided, respectively, with surfaces or films 22 and 23. The bodies 20 and 21 are suitably secured together with their respective films 22 and 23 sandwiched between them in electrical contact. The electrodes 11 and 12 are in electrical contact with the bodies 20 and 21 and they may be embedded therein or applied to the outer surfaces thereof. The leads 13 and 14 connect this device into the electrical load circuit. The current flow is through the bodies 20 and 21 and their respective surfaces or films 22 and 23 and the control of the current flow is accomplished principally in the surfaces or films 22 and 23, the material of the bodies being in its conducting state and the material of the surfaces or films being in its blocking state.

The solid state current controlling device of FIG. 5 includes a body 24 of solid state semiconductor material and a pair of spaced apart electrodes 11 and 12 suitably secured to the body 24. The leads 13 and 14 connect the device in series in the electrical load circuit. The electrodes 11 and 12 may be embedded in the body 24 or they may be suitably applied to the surface thereof. The current flow is along the body 24 between the electrodes 11 and 12 and the control of the current flow is principally accomplished in the bulk of the body 24, the effective material between the electrodes normally being in its blocking state.

In FIG. 6, the solid state current controlling device includes a body 25 having a surface or film 26 on one face thereof along with spaced apart electrodes 11 and 12 suitably applied to the surface or film 26. Here, the current flow is principally along the body and through the surface or film 26 between the electrodes 11 and 12 and the body and the control of the current flow takes place principally in the surface or film 26, the material of the body being in its conducting state and the material of the surface or film normally being in its blocking state.

The solid state current controlling device of FIG. 7 is similar to that of FIG. 6, it including a body 27 of solid state semiconductor material 27 having a surface or film 28. A pair of electrically conducting electrodes 29 and 30, in the form of interleaving metallic combs, are suitably applied to the surface or film 28. Here, the current flow is principally along the body and through the surface or film 28 between the electrodes 29 and 30 and the body and the control of the current flow occurs principally in the surface or film 28, the material of the body being in its conducting state and the material of the surface or film normally being in its blocking state. The electrodes 29 and 30 are provided with leads 13 and 14 for connecting the same into the electrical load circuit.

The solid state current controlling device of FIG. 8 includes a pellet or bead 31 of solid state semiconductor material which in turn preferably has a surface or film. A pair of electrically conducting electrodes 32 and 33 are suitably adhered to the surface or film of the pellet or bead 31 and the electrodes 32 and 33 may be extended to provide leads 13 and 14 for connecting the device into the electrical load circuit or they may be provided with separate leads for this purpose. Here, the current flow is essentially through the surface or film and the pellet or bead 31 between the electrodes 32 and 33 and the control of the current takes place principally in the surface or film, the material of the pellet or bead being in its conducting state and the material of the surface or film normally being in its blocking state.

The solid state current controlling device of FIG. 9 includes a pair of electrically conducting wires 34 and 35 which are coated with solid state semiconductor materials 36 and 37. The semiconductor materials 36 and 37 on the wires 34 and 35 are suitably held in electrical contact and the current flow is through the semiconductor material 36 and 37 between the wires 34 and 35, the semiconductor material normally being in its blocking state. The wires 34 and 35 may be extended to form leads 13 and 14 for connecting the device into the electrical load circuit or they may be provided with separate leads for this purpose. While FIG. 9 illustrates both wires 34 and 35 having semiconductor material thereon, the semiconductor material may be omitted from one of the wires, in which event the bare wire would be placed in electrical contact with the semiconductor material on the other wire. Efficient operation and satisfactory results are obtained with either arrangement.

The solid state current controlling device of FIG. 10 is similar to that of FIG. 9, but differs therefrom in the manner of maintaining the wires and the semiconductor materials in electrical contact with each other. In FIG. 10 a pair of wires 38 and 39 are provided with coatings of semiconductor material 40 and 41, the wires 38 and 39 and the semiconductor material 40 and 41 being twisted together to maintain the proper electrical contact therebetween. Here, the flow of current is through the semiconductor materials 40 and 41 between the wires 38 and 39, the semiconductor materials operating to control the current flow. The wires 38 and 39 may be extended to provide leads 13 and 14 for connecting the device into the electrical load circuit or they may be provided with separate leads for this purpose. Here, as in FIG. 9, only one of the wires need be coated with the semiconductor material and in both instances satisfactory results and efficient operation are obtained.

The solid state current controlling device of FIG. 11 also utilizes wires 42 and 43 which are coated with suitable semiconductor materials 44 and 45. The semiconductor materials 44 and 45 electrically contact each other when the wires 42 and 43 are crossed as illustrated in FIG. 11. The wires 42 and 43 may be extended to form leads 13 and 14 for connecting the device into the electrical load circuit or separate leads may be provided for this purpose. The current flow is through and controlled by the semiconductor materials 44 and 45 where they cross and engage each other, the materials normally being in their blocking state. The other ends of the wires 42 and 43 may be utilized, if desired, as the control electrodes. As in the devices of FIGS. 9 and 10, only one of the wires 42 or 43 need be coated with the semiconductor material and, in both instances, efficient operation and satisfactory results are obtained.

The solid state current controlling device of FIG. 12 is a four electrode device. It includes a body 46 of solid state semiconductor material along with electrodes 11 and 12 suitably applied thereto on opposite faces thereof, the electrodes 11 and 12 being provided with leads 13 and 14 for connecting the same into the electrical load circuit. Here, the current flow is through the body 46 and the control of the current flow is accomplished principally in the bulk of the body 46, the effective material between the electrodes normally being in its blocking state. Another face of the body 46 is provided with an electrode 47 carrying a lead 48 and a further face of the body 46 is provided with an electrode 49 provided with a lead 50. The electrodes 47 and 49 are essentially control electrodes for conditioning the body 46 to conduct current between the electrodes 11 and 12 or to block the current flow between the electrodes 11 and 12. The electrodes 11, 12, 47 and 49 may be embedded in the body 46 or they may be applied to the surfaces thereof. Thus, in the device of FIG. 12 current flow through the device between the leads 13 and 14 is controlled by electrical signals or fields applied to the leads 48 and 50.

The solid state current controlling device of FIG. 13 is similar to that of FIG. 12, it including a body of solid state semiconductor material 55 having electrodes 11 and 12 applied thereto and connected to leads 13 and 14 for connecting the device in the electrical load circuit, the effective material between the electrodes normally being in its blocking state. It also includes control electrodes 47 and 49 connected by leads 48 and 50 into a control circuit. Here, however, the electrodes 47 and 49 are electrically insulated from the body 55 by means of insulators 56 and 57 so that the current flow between the electrodes 11 and 12 is isolated from the electrodes 47 and 49. The current flow is controlled by an electrical field comprising essentially a capacitive or charging effect applied between the control electrodes 47 and 49 by the control circuit. Here, the solid state semiconductor body 55 has substantially an hour glass configuration whereby the current carriers are concentrated between the control electrodes 47 and 49 to provide a more efficient control of the current flow.

The solid state current controlling device of FIG. 14 is similar to that of FIG. 12, but it being a three electrode device as distinguished from a four electrode device. In FIG. 14, the device includes a solid state semiconductor body 51, electrodes 11 and 12 applied to opposite faces thereof and a single control electrode 47 applied to another face thereof, the effective material between the electrodes normally being its blocking state, and the electrodes 11 and 12 being connected by leads 13 and 14 to the electrical load circuit and the electrode 47 being connected by a lead 48 to an electrical control circuit which in turn may also be connected to either of the leads 13 or 14. Here, as in FIG. 12, the electrodes 11, 12 and 47 may be embedded in the body 51 or may be applied to the surfaces thereof.

The solid state current controlling device of FIG. 15 includes a solid state semiconductor body 52 having electrodes 11 and 12 applied to opposite faces thereof, the electrodes 11 and 12 having leads 13 and 14 for connecting the device into the electrical load circuit. Here, also, a control electrode 47 is applied to one of the faces, as for example, the face containing the electrode 11, the control electrode 47 being connected by a lead 48 to the control circuit and the control circuit also being connected to the lead 14. The electrodes 11, 12 and 47 may be embedded in the body 52 or applied to the surfaces thereof. The flow of current is through the body 52 between the electrodes 11 and 12 and the control electrode 47 operates to control the current flow, the effective material of the body between the electrodes normally being in its blocking state.

In FIG. 16, the solid state current controlling device is similar to that of FIG. 15. However, in FIG. 16, the electrodes 11 and 12 are applied to a surface or film 54 on the solid state semiconductor body 53, the material of the body being in its conducting state and the material of the surface or film normally being in its blocking state. The flow of current between the electrodes 11 and 12 is through the body 53 and the surface or film 54, the control of the current flow being controlled by the control electrode 47.

The solid state current controlling device of FIG. 17 includes a solid state semiconductor body 58 having a surface or film 59, the electrodes 11, 12 and 47 being applied to that surface or film 59, the material of the body being in its conducting state and the material of the surface or film normally being in its blocking state. The flow of current between the electrodes 11 and 12 is along the body and through the surface or film 59 and the control of the current flow by the electrode 47 takes place principally in the surface or film 59.

The electrode and lead arrangements in the devices of FIGS. 15, 16 and 17 may be differently connected into the electrical load and control circuits if desired. For example, the leads 13 and 48 may be connected to the load circuit and the lead 14 connected to the control circuit.

Figures 18, 19, 20, 21:
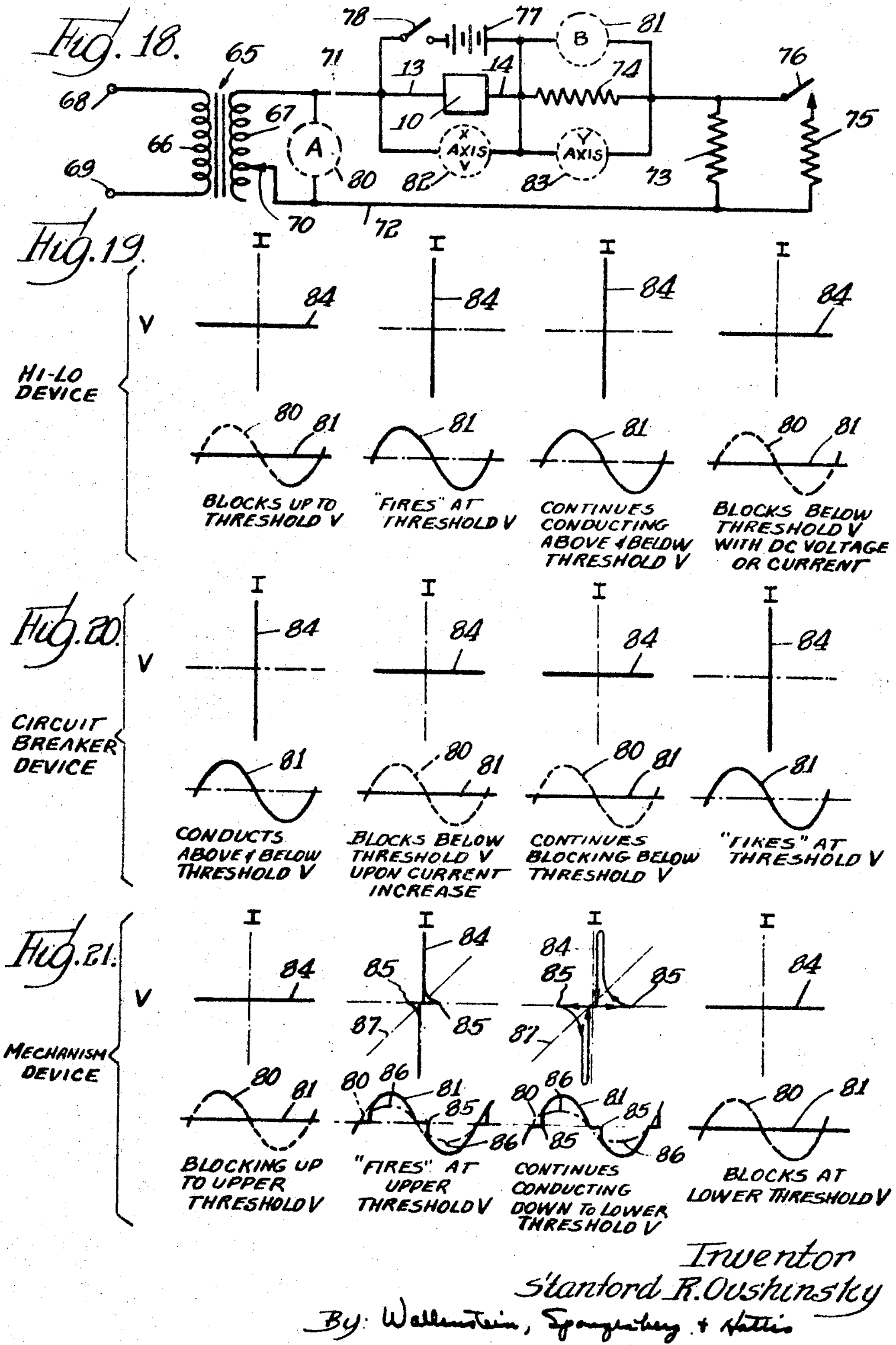
FIG. 18 is a schematic wiring diagram of a test setup which is capable of testing and showing the operation of the solid state current controlling devices of this invention including the Hi-Lo, Circuit Breaker and Mechanism devices.
FIG. 19 is a group of curves showing the manner of operation of the Hi-Lo device.
FIG. 20 is a group of curves showing the manner of operation of the Circuit Breaker device.
FIG. 21 is a group of curves showing the manner of operation of the Mechanism device.

While the bodies 15 of FIG. 2, 18 of FIG. 3, 20 and 21 of FIG. 4, 25 of FIG. 6, 27 of FIG. 7, 53 of FIG. 16 and 58 of FIG. 17 have been described as being formed of semiconductor material having surfaces or films of semiconductor material thereon, those bodies may be formed of any suitable conducting material, upon which the surface or film of semiconducting material may be suitably coated or deposited as by vacuum deposition or the like. This is made possible since the control of the current flow takes place in the surfaces or films of these devices. Likewise, the bodies 25 of FIG. 6, 27 of FIG. 7, 53 of FIG. 16 and 58 of FIG. 17 may be made of a suitable insulating material such as plastic or glass or the like, if desired, with the surface or film of semiconducting material suitably coated or deposited thereon. This is made possible in these devices since it is not necessary to conduct current through these bodies, the conduction taking place solely in the surfaces or films.

While many different memory type semiconductor materials for providing the aforementioned memory characteristics may be utilized, the following are examples of some of the Hi-Lo memory devices of FIGS. 1 to 8 and 12 to 17 which utilize memory type semiconductor materials and which have given satisfactory results (the percentages being by weight): anodized bodies or pellets formed from 50% tellurium and 50% germanium having nickel electrodes vapor deposited thereon; bodies or pellets formed from 50% tellurium and 50% germanium, etched with nitric acid, and having metal electrodes, such as tungsten, applied to the surface thereof; bodies or pellets formed from 50% tellurium and 50% germanium which have been ground, polished and chlorinated and which have metal electrodes applied to the surface thereof; bodies or pellets formed from 50% tellurium and 50% n-type germanium having metal electrodes applied to the surface thereof; bodies or pellets formed from 50% tellurium and 50% germanium with a 25% addition of vanadium pentoxide and having metal electrodes applied to the surface thereof; bodies or pellets formed from 50% tellurium and 50% germanium with the addition of 10% magnetic particles, such as ground ceramic magnetic materials, with metallic electrodes applied to the surface thereof; bodies or pellets formed from 3.81 grams of tellurium and 2.42 grams of antimony with metallic electrodes applied to the surface thereof; bodies or pellets formed from 50% tellurium and 50% gallium antimonide with metallic electrodes applied to the surface thereof; bodies or pellets formed from lead sulfide, etched with nitric acid, and metal electrodes applied to the surface thereof; bodies or pellets formed from 47% tellurium, 47% germanium, 5% gallium arsenide and 1% iron having metal electrodes applied to the surface thereof; bodies or pellets formed from 50% tellurium and 50% nickel and metal electrodes applied to the surface thereof; bodies or pellets formed from 50% tellurium and 50% germanium which have been heated, outgassed and cooled in vacuum with metallic electrodes applied to the surface thereof; bodies or pellets formed from 50% tellurium and 50% silicon with metal electrodes applied to the surface thereof; bodies or pellets formed from 50% tellurium and 50% indium antimonide with metallic electrodes applied to the surface thereof; and bodies or pellets formed from 50% selenium and 50% germanium with metallic electrodes applied to the surface thereof.

Satisfactory Hi-Lo memory devices have also been formed from sandwiches of tellurium oxide, aluminum telluride and tellurium oxide, and from sandwiches of tellurium oxide, tellurium metal and tellurium oxide, with metal electrodes applied to the outer faces thereof.

Satisfactory Hi-Lo memory devices have additionally been made by dipping heated gold wires in a powder mixture of 50% tellurium and 50% germanium, the powdered material adhering to the gold wires and the gold wires diffusing into the material, such coated wires being electrically contacted as illustrated in FIGS. 9 to 11 of the drawings. Satisfactory Hi-Lo devices have further been made as follows: exposing iron wire to the atmosphere to form an oxide surface or film or coating thereon and electrically contacting such wires as illustrated in FIGS. 9 to 11; subjecting copper wire to a flame in the atmosphere to form an oxide surface or film or coating thereon and electrically contacting such wire as illustrated in FIGS. 9 to 11; and exposing aluminum wire to the atmosphere to form an oxide surface or film or coating thereon and electrically contacting such wires as illustrated in FIGS. 9 to 11. The oxide coatings on these wires form suitable solid state semi-conductor materials for controlling the current flow in these Hi-Lo devices. Tellurium metal treated with nitric acid to form an oxide film thereon which is electrically contacted by metallic electrodes also forms a satisfactory Hi-Lo memory device.

The following are examples of some of the Circuit Breaker memory devices of FIGS. 1 to 8 which utilize memory type semiconductor materials and which have given satisfactory results: bodies or pellets formed from 90% tellurium and 10% germanium with metal electrodes applied to the surface thereof; bodies or pellets formed from 90% tellurium, 5% germanium and 5% silicon with metal electrodes applied to the surface thereof; bodies or pellets formed from 95% tellurium and 5% germanium with metal electrodes applied to the surface thereof; bodies or pellets formed from 50% tellurium and 50% germanium with cesium diffused therein and with metal electrodes applied to the surface thereof; bodies or pellets formed from 50% tellurium and 50% germanium which have been ground, polished and chlorinated and which have metal electrodes applied to the surface thereof; bodies or pellets formed from 50% tellurium and 50% germanium which have been heated, outgassed and cooled in vacuum with metal electrodes applied to the surface thereof; bodies or pellets formed from 50% tellurium and 50% germanium and coated with 71.87% tellurium, 14.05% arsenic, 13.06% gallium and 1% lead sulfide with metal electrodes applied to the surface thereof; bodies or pellets formed from 47% tellurium, 47% germanium, 5% gallium arsenide and 1% iron with metal electrodes applied to the surface thereof; and bodies or pellets formed from 90% selenium and 10% germanium with metal electrodes applied to the surface thereof.

Satisfactory Circuit Breaker memory devices have also been formed by dipping heated gold wires in a powder mixture of 50% tellurium and 50% germanium, the powdered material adhering to the gold wires and the gold wires diffusing into the material. These coated wires may be electrically contacted in the manner shown in FIGS. 9 to 11 of the drawings.

While many different mechanism type semiconductor materials for providing the aforementioned switching characteristics utilizing a holding current for the low resistance or conducting condition may be utilized, the following are examples of some of the Mechanism devices of FIGS. 1 to 8 and 14 to 17 which utilize mechanism type semiconductor materials, and which have given satisfactory results: bodies or pellets formed from a mixture of 25% arsenic and 75% of a mixture of 90% tellurium and 10% germanium with metal electrodes applied to the surface thereof; bodies or pellets formed from the foregoing plus the addition of 5% silicon with metal electrodes applied to the surface thereof; bodies or pellets formed from 75% tellurium and 25% arsenic with metal electrodes applied to the surface thereof; bodies or pellets formed from 71.8% tellurium, 14.05% arsenic, 13.06% gallium and the remainder lead sulfide with metal electrodes applied to the surface thereof; bodies or pellets formed from 72.6% tellurium, 13.2% gallium and 17.2% arsenic with metal electrodes applied to the surface thereof; bodies or pellets formed from 72.6% tellurium, 27.4% gallium arsenide with metallic electrodes applied to the surface thereof; bodies or pellets formed from 85% tellurium, 12% germanium and 3% silicon with metal electrodes applied to the surface thereof; bodies or pellets formed from 50% tellurium and 50% gallium with metal electrodes applied to the surface thereof; bodies or pellets formed from 67.2% tellurium, 25.3% gallium arsenide and 7.5% n-type germanium with metal electrodes applied to the surface thereof; bodies or pellets formed from 75% tellurium and 25% silicon with metal electrodes applied to the surface thereof; bodies or pellets formed from 75% tellurium and 25% indium antimonide with metal electrodes applied to the surface thereof; bodies or pellets formed from 55% tellurium and 45% germanium with metal electrodes applied to the surface thereof which operate both as Mechanism and Circuit Breaker devices; bodies or pellets formed from 45% tellurium and 55% germanium with metal electrodes applied to the surface thereof which provide a low level Mechanism device which can be pulsed off by the application of a D.C. voltage or current; and bodies or pellets formed from 75% selenium and 25% arsenic with metal electrodes applied to the surface thereof.

Additionally, as set forth in the above referred to patent applications of which this application is a continuation in part, the semiconductor materials may also include pellets or wafers or layers or films formed from aluminum telluride in argon or in air: mixtures of 50% aluminum and 50% tellurium, 50% aluminium and 50% tellurium plus at least 1% indium and/or gallium; tellurium oxide, tellurium oxide plus at least 1% indium and/or gallium; combinations of aluminum telluride and tellurium oxide; oxides of tellurium, copper, germanium and tantalum; mixtures of 87.6 parts tellurium to 12.4 parts of aluminum, 31 parts of tellurium to 13 parts of aluminum, aluminum telluride mixed two parts to one part each of germanium and germanium oxide; mixtures of 90% tellurium and 10% germanium, 50% tellurium and 50% gallium arsenide.

In the aforementioned bodies and pellets included in the Hi-Lo, Circuit Breaker and Mechanism devices, the materials are preferably ground in an unglazed porcelain mortar to an even powder consistency and thoroughly mixed. They are then preferably tamped and heated in a sealed quartz tube to above the melting point of the material which has the highest melting point. The molten material may be cooled in the tube and then broken into pieces, with pieces ground to proper shape to form the bodies or pellets, or the molten material may be cast from the tube into preheated graphite molds to form the bodies or pellets. The initial grinding of the materials may be done in the presence of air or in the absence of air, the former being preferable where considerable oxides are desired in the ultimate bodies or pellets.

After the bodies or pellets may be so formed, they are surface treated, as by grinding, etching, chlorinating or the like, and by exposing such surfaces to the atmosphere so as to provide surface states having considerable current carrier restraining centers. The electrically conducting electrodes are preferably applied to such surfaces. Other manners of providing current carrier restraining centers, as described in the forepart of this specification, may also be utilized. Since in the formation of the bodies or pellets they are heated and allowed to cool, they in the case of the memory devices will normally be in their low resistance or conducting state, but they or the surfaces or films thereof may be treated, as described, to place them or the surfaces or films thereof in their high resistance or blocking state where considerable current carrier restraining centers or states or conditions are present. In the case of the non-memory Mechanism devices, the bodies or pellets will normally be in their high resistance or blocking state. Alternatively, in forming the materials it may be desirable to press the mixed powdered materials under pressures up to at least 1000 p.s.i. until the powdered materials are completely compacted, and then the completely compacted materials may be initially heated, as for example, up to 400° C., with the remaining heating taking place by exothermic reaction. The various types of solid state current controlling devices illustrated in FIGS. 1 to 17 may be formed from the various materials discussed above.

Instead of forming bodies or pellets, the foregoing semiconductor materials may be coated on a suitable substrate as by vacuum deposition or the like, and electrodes suitably applied thereto, such as illustrated in FIGS. 2, 3, 4, 6, 7, 16 and 17. A particularly satisfactory Mechanism device which is extremely accurate and repeatable in production has been produced by vapor depositing on a smooth steel body or pellet a thin film of tellurium, arsenic and germanium and by applying tungsten electrodes to the deposited film. The film may be formed if desired, by depositing in sequence layers of tellurium, arsenic, germanium, arsenic and tellurium and then heating to a temperature just below the sublimation point of the arsenic to unify and fix the film. When films of the semiconductor materials of this invention are vacuum deposited on substrates they normally assume their high resistance or blocking state because of rapid cooling of the materials as they are deposited or they may be readily made to assume such state in the manners described above.

The electrodes which are utilized in the solid state current controlling devices of this invention may be substantially any good conducting material which is usually relatively inert with respect to the various aforementioned semiconductor materials. Gold electrodes have a strong tendency to diffuse into such semiconductor materials. Aluminum electrodes tend to affect the aforementioned materials, particularly those containing tellurium and germanium, and have a tendency to cause the Mechanism devices to go to their blocking states and, as a result, the use of aluminum electrodes assists greatly in obtaining a modulation of the current flow through the Mechanism device upon varying the applied electrical field between the upper and lower threshold values thereof.

The electrodes may be applied to the surfaces of the solid state semiconductor bodies or pellets in any desired manner, as by mechanically pressing them in place, by fusing them in place, by soldering them in place, by vapor deposition, or the like. Preferably, after the electrodes are applied to the bodies or pellets, a pulse of voltage and current is applied to the devices for conditioning and fixing the electrical contact between the electrodes and the semiconductor material. As expressed above, the current controlling devices of this invention may be encapsulated if desired.

FIG. 18 is a schematic wiring diagram of a test setup which is capable of testing and showing the operation of the solid state current controlling devices of this invention including the Hi-Lo, Circuit Breaker and Mechanism devices. As illustrated, the test setup includes a variable transformer 65, such as a Variac, having a primary winding 66 and a secondary winding 67. The primary winding 66 is connected to a pair of terminals 68 and 69 which in turn are connected to a source of A.C. electrical energy, such as a 220 volt source. A movable contact 70 contacts the winding 67 so as to provide selected A.C. voltages. The secondary winding 67 and its movable contact 70 are connected into an A.C. load circuit 71, 72 including an electrical load 73. Also included in the load circuit 71, 72 is another load resistor 74 which is utilized in connection with an oscilloscope for indicating electrical conditions in the test setup. An additional load resistance 75 may be connected in parallel with the load resistance 73 by a switch 76 for increasing the total load and hence the current flow in the load circuit 71, 72. The solid state circuit controlling devices of this invention are connected in series in the load circuit 71, 72 for controlling the current flow therein and, as illustrated in FIG. 18, the solid state circuit controlling device is designated a 10 and is connected into the load circuit by the leads 13 and 14. While FIG. 18, for purposes of illustration, includes the solid state circuit controlling device of FIG. 1, the other solid state circuit controlling devices of FIGS. 2 to 17 may also be utilized in this test setup. A source of D.C. or A.C. voltage and current is adapted to be connected across the solid state circuit controlling device 10, it being illustrated as a battery 77 which is adapted to be connected across the solid state circuit controlling device 10 by a switch 78 in a control circuit having very little, if any, resistance.

The test setup of FIG. 18 also includes an oscilloscope for exhibiting by appropriate traces the electrical conditions existing in the test setup. The oscilloscope includes connections across the secondary 67 of the transformer 65 for producing a time-voltage trace corresponding to the A.C. voltage applied to the load circuit by the transformer, this connection being designated 80 and "A" in FIG. 18 and producing traces 80 as illustrated in dotted lines in FIGS. 19 to 21. The oscilloscope also includes connections across the series resistance 74 in the load circuit 71, 72 for producing a time-voltage drop trace and, hence, a time-current trace corresponding to the current flow in the load circuit, this connection being illustrated at 81 and "B" in FIG. 18 and the traces produced thereby being illustrated in solid lines at 81 in FIGS. 19 to 21. The oscilloscope also includes connections across the solid state current controlling device 10 which are designated "X axis V" and 82 and which respond to the voltage drop across the solid state circuit controlling device 10. The oscilloscope further includes connections across the series resistance 74 which are designated "Y axis I" and 83 and these connections respond to the current flow through the load circuit. The connections 82 and 83 are compared in the oscilloscope for producing voltage-current traces 84 in accordance with the existing voltage and current conditions affecting the solid state current controlling device 10, such voltage-current traces being designated at 84 in FIGS. 19 to 21.

Before describing the A.C. operations of the Hi-Lo, Circuit Breaker and Mechanism devices in the aforementioned test setup of FIG. 18, and for a better understanding thereof, a brief description of the D.C. operation thereof will first be made since each half cycle of the A.C. operation may be considered a D.C. operation involving opposite polarities. In this connection, it is assumed that the test setup of FIG. 18 is powered with a variable D.C. voltage source and reference is made to the characteristic curves of FIGS. 32 and 33 plotting current in the circuit against the applied D.C. voltage across the device as determined by the oscilloscope connections 83 and 82 of FIG. 18.

Figure 32:
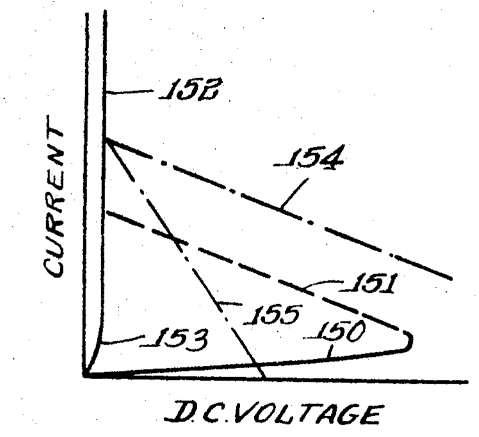
FIG. 32 is a characteristic curve of the Hi-Lo and Circuit Breaker memory devices of their blocking and conducting conditions plotting current against D.C. voltage.

FIG. 32 illustrates the characteristic curves of the Hi-Lo and Circuit Breaker memory devices. Assuming the memory control device in its blocking state and a gradual increase in applied voltage, there is a slight increase in current in the circuit as indicated by the curve 150 until such time as a voltage threshold value is reached. The blocking condition of the device is immediately altered and switched from its blocking condition as indicated by the line 151 to its conducting condition and the current flow through the circuit is then along the line 152. The device has memory of this conducting condition and will remain in this conducting condition until switched to its blocking condition as hereafter described, and when the voltage is substantially decreased or removed, the current flow is along the curve 153. The lower portion 153 of the low resistance conducting curve is substantially ohmic while the upper portion 152 of the curve, in some instances, has a substantially constant voltage characteristic as shown and, in other instances, has a substantially ohmic characteristic providing a slight slope thereto. The load line of the circuit is illustrated at 154, it being substantially parallel to the line 151. When a D.C. current is applied independently of the load circuit to the Hi-Lo device as by the battery 77 and the switch 78 in FIG. 18, the load line for such current is along the line 155 since there is very little, if any, resistance in this control circuit, and as the load line 155 intersects the curve 150, the conducting condition of the device is immediately realtered and switched to its blocking condition. Also as described above in connection with the Circuit Breaker device operation, when the load resistance in the load circuit decreases substantially as by closing the switch 76 in FIG. 18, the load line of the load circuit is substantially along the line 155 of FIG. 32 and as the load line 155 intersects the curve 150, the conducting condition of the device will also be immediately realtered and switched to its blocking condition. The devices will remain in their blocking condition until switched to their conducting condition by the reapplication of a threshold voltage.

Figure 33:
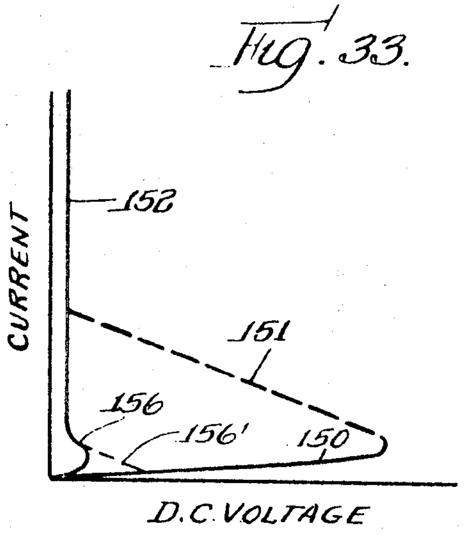
FIG. 33 is a characteristic curve similar to FIG. 32 of the Mechanism device without memory and plotting current against D.C. voltage.

FIG. 33 sets forth the characteristic curves of the mechanism device without memory included in the D.C. load circuit. Here, the device is normally in its blocking condition and as the D.C. voltage is increased, there is a slight increase in current as illustrated by the line 150. When the applied D.C. voltage reaches a threshold value, the blocking condition of the device is immediately altered and switched along the line 151 to its conducting condition as illustrated by the curve 152. The low resistance conducting condition as shown by the substantially straight curve 152 has a substantially constant ratio of voltage change to current change and conducts current at a substantially constant voltage above a minimum current holding value which is adjacent the bottom of the substantially straight curve 152. The voltage is substantially the same for increase and decrease in current above the minimum current holding value as shown by the curve 152. When, however, the applied D.C. voltage is lowered to a value to decrease the current to a value below said minimum current holding value, the low resistance conducting condition follows substantially the curve 156 and immediately causes realteration and switching to the high resistance blocking condition. The realtering and switching may continue along the curve 156 which sometimes occurs where alternating current is being switched or the realteration and switching may be substantially instantaneous as shown by the broken line 156' which usually occurs when direct current is being switched. In either event, the decrease in current to a value below the minimum current holding value immediately causes realtering of the low resistance conducting condition to the high resistance blocking condition. Immediately is used herein in its normal sense and means starting the realteration directly, at once and without any intermediary or intermediation. The device will remain in its blocking condition until switched to its conducting condition by the application of a threshold voltage. Some of the control devices which have memory of their conducting state, the operation of which is illustrated in FIG. 32, when cycled sufficiently rapidly, will follow the operation illustrated in FIG. 33 rather than in FIG. 32.

Assuming that a Hi-Lo memory device is included in the A.C. test circuit of FIG. 18, the switch 76 controlling the additional load resistor 75 is maintained open and the switch 78 is manipulated for providing the Hi-Lo A.C. operation. The Hi-Lo operation is illustrated by the trace curves 80, 81 and 84 in FIG. 19. For purposes of explanation it is assumed that the Hi-Lo device 10 is in its blocking state when it is inserted in series into the test load circuit 71, 72 and, as shown in the first part of FIG. 19, current flow through the device 10 is blocked. The time-voltage curve 80 shows the applied voltage and the time-current curve 81 shows that no current is flowing, this latter condition also being illustrated by the voltage-current curve 84 lying along the X or V axis. This corresponds to the curve 150 in FIG. 32. Thus, the Hi-Lo device has a high blocking resistance and acts as an insulator to block the current flow through the load circuit. As the contact 70 is manipulated to increase the applied voltage, the Hi-Lo device 10 continues to block the current flow until such time as the applied voltage rises to a threshold value. When this occurs, the Hi-Lo device 10 "fires" and is substantially instantaneously altered or changed from its blocking state or condition to its conducting state or condition wherein the conducting resistance thereof is decreased to such a value that the Hi-Lo device 10 operates substantially as a conductor for allowing current flow through the load circuit. This condition is illustrated in the second part of FIG. 19 where the time-current curve 81 overlies the time-voltage curve 80 indicating substantially complete current flow through the device. This condition is also illustrated by the voltage-current curve 84 along the Y or I axis. This corresponds to the curve 152, 153 in FIG. 32. When so "fired," the Hi-Lo device 10 continues conducting above and below the aforementioned threshold value, as illustrated in the third part of FIG. 19, and this conducting state or condition continues even though the applied voltage decreases to zero or is removed entirely.

When the applied voltage is below the threshold value and the switch 78 is then closed to apply a D.C. or A.C. voltage and high current to the device 10, the device 10 is substantially instantaneously changed from its conducting state or condition to its blocking state or condition, as illustrated in the fourth part of FIG. 19. This condition is there shown by the curves 80, 81 and 84. While there is a slight slope to the curves 84 in FIG. 19, the slope is so small that it has not been illustrated in FIG. 19. The D.C. or A.C. voltage or current need only be momentarily applied to cause the substantially instantaneous change of the device from its conducting state to its blocking state. In lieu of the switch 78, a rheostat or potentiometer may be utilized for gradually applying the D.C. or A.C. voltage or current to the device 10, the device 10 being substantially instantaneously realtered or changed to its blocking state or condition when the applied signal reaches a predetermined value. The device 10 remains in its blocking state until such time as the applied voltage is again raised to its threshold value. Thus, the Hi-Low device 10 is changed to its conducting state by the application of an electrical field (applied voltage) above a threshold value and is changed to its blocking state, when that applied electrical field is below its threshold value, by applying a different electrical field (D.C. or A.C. voltage or current). The Hi-Lo device 10 has substantially complete memory, remembering its existing state and not being changed from that state until such time as the appropriate electrical field is applied thereto.

As one typical example, a Hi-Lo device, having a memory type semiconductor material formed from 50% tellurium and 50% germanium and having a surface with oxides and having tungsten electrodes applied to the surface of the semiconductor material, has a blocking resistance of at least 50 million ohms and a conducting resistance of 1 ohm or less. For about a 10 watt load utilizing about a 1,000 ohm resistance, the application of a threshold voltage of about 20 volts A.C. causes the device to "fire" and change to its conducting state, and the momentary application of about a 5 volt D.C. pulse at an applied A.C. voltage of about 15 volts causes the device to change to its blocking state. Increasing the current carrier restraining centers, in the manners pointed out in the foremost part of the specification, increases the threshold value of the applied voltage required to "fire" the device. Also, if the aforementioned Hi-Lo device is provided with gold electrodes in lieu of the tungsten electrodes, a D.C. pulse of only about 2 volts is required to change the device from its conducting state to its blocking state. By appropriate selection of materials and electrodes, and by appropriate treatment of the materials and application of the electrodes thereto, the Hi-Low devices may be tailor made to fit almost any electrical characteristic requirement.

The manner of A.C. operation of the Circuit Breaker memory device is illustrated by the curves 80, 81 and 84 in FIG. 20. Here, the switch 78 is maintained open and the switch 76 is manipulated for changing the load in the electrical load circuit and hence the current flow through the Circuit Breaker device. For explaining the operation of the Circuit Breaker device, it is assumed that a Circuit Breaker device 10 is placed in the test circuit while in its conducting state or condition and while the electrical field (applied A.C. voltage) is below its threshold value. This is illustrated by the curves in the first part of FIG. 20, wherein the time-current curve 81 overlies the time-voltage curve 80 and wherein the composite voltage-current curve 84 lies along the Y or I axis, this indicating substantially complete current flow at applied voltages below the threshold value. This corresponds to the curve 152, 153 in FIG. 32. If the load in the load circuit is then increased, as by closing the switch 76 to increase the current flow through the Circuit Breaker device 10, the Circuit Breaker device 10 is substantially instantaneously realtered or changed from its conducting state or condition to its blocking state or condition as illustrated in the second part of FIG. 20, wherein the time-current curve 81 and the voltage-current curve 84 illustrate no current flow. This corresponds to the curve 150 in FIG. 32. In lieu of the switch 76, a rheostat or potentiometer may be utilized for gradually increasing the load and hence the current flow through the device 10, the device 10 being substantially instantaneously realtered or changed to its blocking state when the increase in current flow reaches a predetermined value. The Circuit Breaker device will remain in its blocking state so long as the applied voltage is below its threshold value, as is shown in the third part of FIG. 20, and this is so even though the applied voltage is completely removed.

When, however, the applied voltage is increased above the threshold value, the Circuit Breaker device 10 "fires" and is substantially instantaneously altered or changed from its blocking state or condition to its conducting state or condition as illustrated in the fourth part of FIG. 20, wherein the time-current curve 81 overlies the time-voltage curve 80 and the composite voltage-current curve 84 lies along the Y or I axis. While there is a slight slope to the curves 84 in FIG. 20, the slope is so small that it has not been illustrated in FIG. 20. Thus, the Circuit Breaker device has memory, remembering its blocking and conducting states, and being substantially instantaneously changed from its conducting state to its blocking state by the imposition of an electrical field (current increase) and being changed from its blocking state to its conducting state by the imposition of another electrical field (applying a voltage above the threshold value).

As one typical example, a Circuit Breaker device, having a memory type semiconductor material formed from 50% tellurium and 50% germanium and having its surface sand blasted and oxidized with nitric acid and then chlorinated and having tungsten electrodes applied to the surface of the semiconductor material, has a blocking resistance of at least 50 million ohms and a conducting resistance of about 1 ohm or less. For about a 10 watt load utilizing about a 1000 ohm resistance, the application of a threshold voltage of about 50 volts A.C. causes the device to "fire" and change to its conducting state. When the device is conducting at said load with an applied voltage of about 45 volts, the current flow may be in excess of 2,000 milliamps, and an increase in current flow due to an increase in the electrical load, in the neighborhood of 100 milliamps, causes the device to substantially instantaneously change from its conducting state to its blocking state. Also, if the aforementioned Circuit Breaker device is provided with gold electrodes in lieu of tungsten electrodes, an increase in current flow of only a few milliamps is sufficient to change the device from its conducting state to its blocking state. The Circuit Breaker devices can also be operated as Hi-Lo devices if desired. By appropriate selection of materials and electrodes, and by appropriate treatment of the materials and application of the electrodes thereto, the Circuit Breaker devices may be tailor made to fit almost any electrical characteristic requirement.

The manner of A.C. operation of the current controlling device of this invention as a Mechanism device is illustrated in FIG. 21. Here, the Mechanism device when placed in the test setup is in its blocking state and it blocks the current flow through the load circuit as shown by the curves 80, 81 and 84 in the first part of FIG. 21. This corresponds to the curve 150 in FIG. 33. It will continue blocking the current flow so long as the applied voltage is below an upper threshold value. When, however, the applied A.C. voltage is increased to at least the threshold value, the Mechanism device "fires" and it is substantially instantaneously altered or changed from its blocking state or condition to its conducting state or condition as indicated by the curves 80, 81 and 84 in the second part of FIG. 21. This corresponds to the curve 152 of FIG. 33. However, as shown at 85 in the time-current curve 81 and the voltage-current curve 84, there is not absolutely complete conduction throughout the complete A.C. cycles, the device being fired a point 85 in each half cycle. This corresponds to the point where curve 150 in FIG. 3 switches along line 151. It is believed that this is so because the Mechanism device at all times tends to realter or change from its conducting state to its blocking state and does so when the instantaneous current nears zero in the A.C. cycle. This corresponds to the curves 156 or 156′ in FIG. 33. As the applied voltage is decreased from its upper threshold value, the points 85 in the curves 81 and 84 may appear later in each half cycle and become more pronounced, as is illustrated in the third part of FIG. 21, and thus the current flow may be modulated (percent off with respect to on) in accordance with the amount of decrease of the applied voltage below the upper threshold value. The direction of the voltage-current trace 84 is indicated by the arrows in the third part of FIG. 21, and it is here noted that the device has a switching characteristic which is completely symmetrical for both the first and second halves of the alternating applied voltage. The portions of the curves 84 between the points 85 on the horizontal and the vertical are traversed so rapidly that there is substantially instantaneous switching from the blocking state to the conducting state, and while dual traces are shown in the third part of FIG. 21 to illustrate the direction of the traces, these traces actually overlie each other as illustrated in the second part of FIG. 21. It is also noted in the second and third parts of FIG. 21 that the vertical current curves 84 have substantially no slope and that current is conducted until the current nears zero in the A.C. cycle. Thus, the Mechanism device has substantially a "zero" minimum holding current value. The substantially vertical current curves 84 are substantially straight and demonstrate that the Mechanism device provides in its conducting condition a substantially constant ratio of voltage change to current change at a substantially constant voltage between the electrodes which voltage is the same for increase and decrease in current above the minimum current holding value and, also, provides for a voltage drop across the device in its conducting condition which is a minor fraction of the voltage drop across the device in its blocking condition near said threshold voltage value. When the instantaneous current through the device in its conducting condition decreases in each half cycle to a value below said minimum current holding value, a value near "zero," it immediately causes realtering or changing of the conducting condition to the blocking condition.

When the applied voltage is decreased to a lower threshold value, the Mechanism device changes from its modified conducting state or condition, as illustrated by the curves 80, 81 and 84 in the third part of FIG. 21, to its blocking state or condition, as illustrated by the curves 80, 81 and 84 in the fourth part of FIG. 21. It is believed that this is due to the applied voltage being insufficient to "refire" the device during the half cycles. The difference between the upper and lower threshold values may be made large or small or even zero depending upon the type of operation desired. The device will remain in its blocking state until such time as the applied voltage is again increased to at least its upper threshold value. Thus, the Mechanism device does not generally have a complete memory when made conducting by an A.C. voltage as is the case of the Hi-Lo and Circuit Breaker devices. The electrical field which changes the Mechanism device from its blocking state to its modified conducting state is the applied voltage above an upper threshold value and the electrical field which changes the device from its modified conducting state to its blocking state is the decrease of the applied voltage to a lower threshold value.

However, as described above, it has been found that, when the Mechanism device with memory is in its conducting state as illustrated in the second and third portions of FIG. 21, and when the load resistor 73 is increased substantially to decrease substantially the current flow through the device, the device tends to become a full conductor, such as illustrated in the second and third portions of FIG. 19, and tends to remain substantially indefinitely in such conducting state when the applied A.C. voltage is decreased to zero. Also, as described above, it has been found that, when the Mechanism device is in its conducting state as illustrated in the second and third portions of FIG. 21, a D.C. bias voltage is also applied, either continuously or in a pulse by the battery 77, the resistance value or state of the device in its conducting state is increased in accordance with the amount of the D.C. bias. This increased resistance value or state is illustrated by the dot and dash curves 86 and 87 in the second and third portions of FIG. 21. When the A.C. voltage and the D.C. bias are removed, the device has memory of that resistance value and remains in that state.

As one example, a typical Mechanism device includes a mechanism type semiconductor material comprising a powdered mixture of 72.6% tellurium, 13.2% gallium and 14.2% arsenic which has been tamped, heated to melting, slowly cooled, broken into pieces and made into pellets by grinding in air to proper shape, and which has tungsten electrodes applied to the surfaces of the pellet. Such a Mechanism device has a high blocking resistance of at least 50 million ohms and a low conducting resistance as indicated by the low voltage drop across the device. It also has an upper threshold voltage of about 60 volts and a lower threshold voltage of about 55 volts. If such pellets are not ground, the Mechanism device has an upper threshold voltage of about 150 volts and a lower threshold voltage of about 140 volts. When aluminum electrodes are utilized in the Mechanism devices, there is a greater tendency for such devices to change to their blocking states with the result that such devices have a greater current modulating range between the upper and lower values of the applied voltage. This would be exemplified in the third part of FIG. 21 by an expansion of the points 85 in the curves 81 and 84 before the device is substantially instantaneously changed from its modified conducting state to its blocking state.

It is also noted that where the Mechanism devices with memory lean toward a semiconductor material of substantially 50% tellurium and 50% germanium they can be pulsed off by increased current flow or by the imposition of a D.C. or A.C. voltage or current as in the case of the Circuit Breaker devices and the Hi-Lo devices, respectively. An example of a Mechanism device which can be operated as a Circuit Breaker device is one having substantially 55% tellurium and 45% germanium with tungsten electrodes. An example of a Mechanism device which can be operated as a Hi-Lo device is one having substantially 45% tellurium and 55% germanium with tungsten electrodes. Where aluminum electrodes are utilized, the devices may be more readily pulsed off. Where one tungsten and one aluminum electrode are utilized, it is found that there is greater resistance to current flow in one half cycle than the other half cycle of the A.C. current flow, and this provides for more ready pulsing off of the devices with minimum decrease in total current flow. By appropriate selection of materials and electrodes, and by appropriate treatment of the materials and application of the electrodes thereto, the Mechanism devices may be tailor made to fit almost any electrical characteristic requirement.

Additions to the various solid state semiconductor materials of arsenic, sulfur, phosphorus, animony, arsenide, sulfides, phosphides and antimonides appear to have the effect of stabilizing the semiconductor materials, and it is believed that they also have the effect of increasing the current carrier restraining centers and/or decreasing or inhibiting the crystallization forces. They may be selected as desired and many of them have been referred to in the aforementioned descriptions of the semiconductor materials. Gold, nickel, iron, manganese, aluminum, cesium and alkali and alkaline earth metal inclusions readily mix in the semiconductor materials and it is believed that they also have a tendency to affect the current carrier restraining centers therein and/or affect the crystallization forces. They may also be selected as desired and many of them have also been referred to in the aforementioned descriptions of the semiconductor materials.

Figures 22, 23, 24, 25, 26, 27, 28, 29, 30, 31:
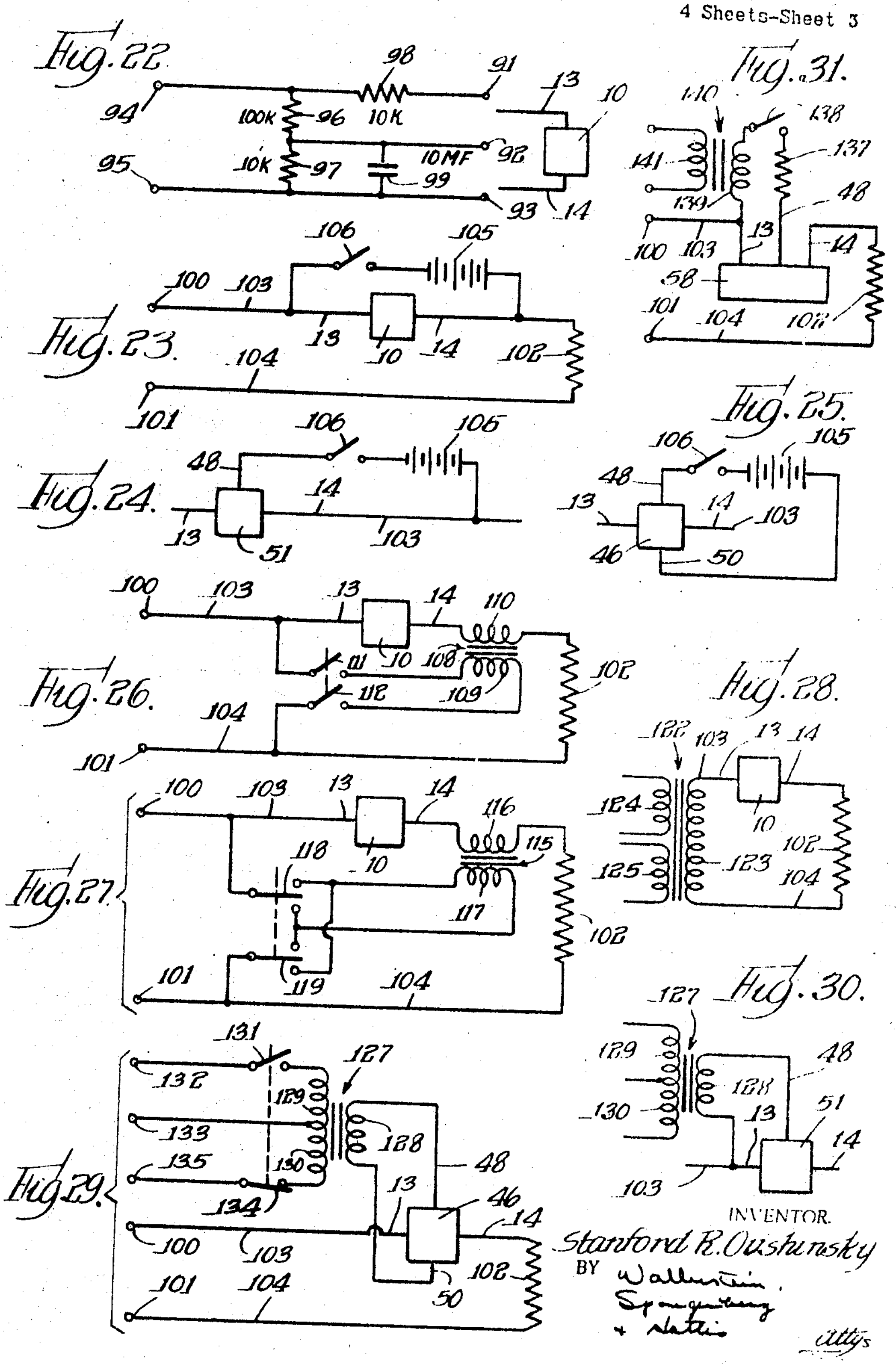
FIG. 22 is a schematic wiring diagram of a circuit arrangement for changing the memory type solid state current controlling devices of this invention from their blocking states to their conducting states and from their conducting states to their blocking states.
FIG. 23 is a schematic wiring diagram of a typical load circuit arrangement utilizing a Hi-Lo device of the two electrode type.
FIG. 24 is a partial schematic wiring diagram corresponding to that of FIG. 23 and illustrating a typical load circuit arrangement utilizing a Hi-Lo device of the three electrode type.
FIG. 25 is a partial schematic wiring diagram corresponding to that of FIG. 23 and illustrating a typical load circuit arrangement utilizing a Hi-Lo device of the four electrode type.
FIG. 26 is a schematic wiring diagram of a typical load circuit arrangement utilizing a Circuit Breaker device.
FIG. 27 is a schematic wiring diagram of a typical load circuit arrangement utilizing a Mechanism device.
FIG. 28 is a schematic wiring diagram of a typical load circuit arrangement utilizing a Mechanism device and operating as a logic circuit, such as an "and" gate circuit.
FIG. 29 is a schematic wiring diagram of a typical load circuit arrangement utilizing a Mechanism device of the four electrode type.
FIG. 30 is a partial schematic wiring diagram similar to that of FIG. 29 and illustrating a typical load circuit arrangement utilizing a Mechanism device of the three electrode type.
FIG. 31 is a schematic wiring diagram of another typical load circuit arrangement utilizing a Mechanism device of the three electrode type.

FIG. 22 is a schematic wiring diagram of a circuit arrangement for changing the memory type Hi-Lo and Circuit Breaker solid state current controlling devices from their blocking states to their conducting states and from their conducting states to their blocking states. Here, the leads 13 and 14 of the circuit controlling devices, such as the device 10, may be applied to terminals 91 and 92 for applying a D.C. voltage thereto to change the device from its blocking state to its conducting state and may be applied to terminals 92 and 93 to change the device from its conducting state to its blocking state. The circuit arrangement of FIG. 22 is energized from terminals 94 and 95 which may be connected to a variable D.C. electrical energy source having, for example, a maximum voltage of about 200 volts. The terminal 94 is connected through resistors 96 and 97 to the terminal 95, the resistor 96 having, for example, a value of 100K and the resistor 97 having, for example, a value of 10K. The terminal 94 is also connected through a resistor 98 to the terminal 91, this resistor having, for example, a value of 10K. The terminal 92 is connected to the juncture between the resistors 96 and 97 and the terminal 93 is directly connected to the terminal 95. A condenser 99 having, for example, a value of 10MF is connected across the terminals 92 and 93 in parallel with the resistor 97.

It is thus seen that when the leads 13 and 14 of the device 10 are contacted with the terminals 91 and 92, a D.C. voltage above a threshold value is applied to the device 10 for substantially instantaneously changing it from its blocking state to its conducting state. This voltage need be only momentarily applied and, thus, it is only necessary to touch the terminals 91 and 92 with the leads 13 and 14. It is also seen that when the leads 13 and 14 of the device 10, which is then in its conducting state, are contacted with the terminals 92 and 93, the condenser 99 is discharged and a substantial D.C. current is caused to flow through the device 10 for substantially instantaneously changing it from its conducting state to its blocking state. Here, again, the current need be only momentarily imposed and, thus, the switching of the device from its conducting state to its blocking state may be accomplished merely by touching the leads 13 and 14 to the terminals 92 and 93. The Hi-Lo and Circuit Breaker devices 10, as expressed above, have complete and long lasting memory so that they may be selectively conditioned for their blocking and conducting states and stored in such states. The Mechanism device with memory may also be switched from its blocking state to its conducting state by touching its leads 13 and 14 to the terminals 91 and 92 for, as described above, the Mechanism device is caused to assume its conducting state by the application of a D.C. voltage thereto, the Mechanism device having memory and remaining in its conducting state. However, to switch the Mechanism device to its blocking state with memory it is necessary to impose an A.C. voltage thereon. Thus, the leads 13 and 14 of the Mechanism device would not be touched to the terminals 92 and 93 for this purpose but, instead, would be touched to terminals having an A.C. voltage applied thereto. All of these devices having these controllable conducting and blocking memory states are admirably suitable for memory devices for use in read-in and read-out devices in computers and the like, and this is especially so since they can directly switch high energy electrical load circuits and eliminate the need for low energy electrical load circuits and related amplifiers as are now required.

FIG. 23 is a schematic wiring diagram of a typical load circuit arrangement utilizing a Hi-Lo device of the two electrode type, such as illustrated in FIGS. 1 to 11. Here, a pair of terminals 100 and 101 are connected to a variable source of electrical energy such as a 100 volt A.C. source. The load circuit includes an electrical load 102 which is connected by conductors 103 and 104 to the terminals 100 and 101. The electrical load 102 may be any desired load such as a heating device, a motor winding, a solenoid, or the like. A Hi-Lo type solid state current controlling device, such as the device 10, is connected in series in the electrical load circuit 103, 104 by its leads 13 and 14. A source of D.C. or A.C. voltage or current, such as a battery 105, is connected across the current controlling device 10 and is controlled by a series connected switch 106.

When the voltage applied to the terminals 100 and 101 is increased above a threshold value, the device 10 is substantially instantaneously changed to its conducting state and, hence, current flows through the electrical load circuit 103, 104 for energizing the electrical load 102. When the applied voltage is decreased below the threshold value, the current controlling device 10 remains in its conducting state so as to continue energizing the electrical load 102. If the switch 106 is then closed, and the closure need be only momentary, the battery 105 imposes a voltage on and a current through the device 10 to substantially instantaneously change the device 10 to its blocking state, whereupon the current flow through the electrical load circuit 103, 104 is interrupted and the electrical load 102 is deenergized. Thus, by manipulating the value of the applied voltage and the switch 106, the electrical load 102 may be energized and deenergized at will. This provides a convenient and simple way of controlling at will a high energy electrical load circuit by means of low energy control signals. Instead of utilizing the switch 106, the applied signal may be gradually varied and when the signal reaches a predetermined value, the device automatically switches to its blocking state.

FIG. 24 is a partial schematic wiring diagram, corresponding to that of FIG. 23, illustrating a typical load circuit arrangement utilizing a Hi-Lo device of the three electrode type, such as the devices of FIGS. 14 to 17. Here, the device, such as the device 51, is connected in series in the load circuit 103 by the leads 13 and 14 and the source of D.C. or A.C. voltage and current, such as the battery 105 controlled by the switch 106, is connected to the lead 14 and the control lead 48. The arrangement of FIG. 24 operates in substantially the same manner as the arrangement of FIG. 23 and, therefore, a further description is not considered necessary.

FIG. 25 is a partial schematic diagram corresponding to that of FIG. 23 and illustrating a typical load circuit arrangement utilizing a Hi-Lo electrical device of the four electrode type, such as the devices of FIGS. 12 and 13. Here, the device, such as the device 46, is connected in series in the electrical load circuit 103 by the leads 13 and 14, and the source of D.C. or A.C. voltage and current, such as the battery 105 controlled by the switch 106, is connected to the leads 48 and 50 of the device 46. The arrangement of FIG. 25 operates in substantially the same manner as the arrangement of FIG. 23 and, accordingly, a further description is not here made.

FIG. 26 is a schematic wiring diagram of a typical load circuit arrangement utilizing a Circuit Breaker device such as disclosed in FIGS. 1 to 11. Here the solid state semiconductor current controlling device, such as the device 10, is connected in series into the load circuit 103, 104 by the leads 13 and 14. The Circuit Breaker device 10, when inserted in the load circuit, is in its conducting state and the voltage applied to the terminals 100 and 101 is lower than the threshold value required to substantially instantaneously switch the device 10 from its blocking state to its conducting state. When the current flow through the load circuit 103, 104 is increased, as for example by an increase in the load 102, the device 10 is substantially instantaneously switched from its conducting state to its blocking state to interrupt the current flow through the load circuit 103, 104. Thus, the device 10 operates as a true Circuit Breaker for protecting the load circuit against overload.

In order to increase the voltage applied to the Circuit Breaker device 10 to substantially instantaneously change it from its blocking state to its conducting state and, hence, reset the device, the secondary winding 110 of a transformer 108 having a primary winding 109 is connected in series in the load circuit 103, 104. The primary winding 109 is connected through a double pole single throw switch 111, 112 to the terminals 100 and 101. The transformer 108 is so constructed that the voltage produced in the secondary winding 110 upon closure of the switch 111, 112 is in phase with the voltage applied to the terminals 100 and 101. Thus, the transformer voltage adds to the voltage produced at the terminals 100 and 101 to provide a resultant voltage across the Circuit Breaker device 10 which is above the threshold value required to switch the device 10 from its blocking state to its conducting state. In this way, the manipulation of the switch 111, 112 provides a simple way of changing or resetting the Circuit Breaker device 10 from its blocking state to its conducting state.

FIG. 27 is a schematic wiring diagram of a typical load circuit arrangement utilizing a Mechanism device of the two electrode type illustrated in FIGS. 1 to 11. Here, the Mechanism device, such as the device 10, is connected in series in the load circuit 103, 104 by the leads 13 and 14. The voltage applied to the terminals 100 and 101 is of a value between the upper threshold value which operates to substantially instantaneously change the device 10 from its blocking state to its conducting state and the lower threshold value which operates to substantially instantaneously change the device 10 from its conducting state to its blocking state. In order to provide voltages above the upper threshold value and voltages below the lower threshold value for switching the device 10 between its blocking and conducting states, the secondary winding 116 of a transformer 115 having a primary winding 117 is connected in series in the load circuit 103, 104. The primary winding 117 is connected through a double pole double throw reversing switch 118, 119 to the terminals 100 and 101.

The reversing switch 118, 119 operates to reverse the phase of the voltage applied to the load circuit by the secondary winding 116 of the transformer 115. When the reversing switch 118, 119 is in one position, the voltage applied by the secondary winding 116 is in phase with and additive with the voltage applied to the terminals 100 and 101, with the result that the total voltage applied to the device 10 is above the upper threshold value so as to cause the device 10 to substantially instantaneously change from its blocking state to its conducting state. When the reversing switch 118, 119 is moved to its other position, the voltage applied to the load circuit by the secondary winding 116 is of opposite phase and bucks the voltage applied to the terminals 100 and 101. As a result, the resultant voltage applied across the device 10 is decreased below the lower threshold value, and the device 10 is substantially instantaneously changed from its conducting state to its blocking state. Thus, by manipulating the reversing switch 118, 119, the device 10 may be substantially instantaneously changed between its blocking and conducting states for opening and closing the load circuit 103, 104.

FIG. 28 is a schematic wiring diagram of a typical load circuit arrangement utilizing a Mechanism device of the two electrode type illustrated in FIGS. 1 to 11 and operating as a logic circuit, such as an "and" gate circuit. Here, the Mechanism device, such as the device 10, is connected in series in the load circuit 103, 104 by the leads 13 and 14. However, the load circuit 103 is energized by the secondary winding 123 of a transformer 122 having a pair of primary windings 124 and 125. The primary windings 124 and 125 are so wound with respect to the secondary winding 123 as to be additive in effect in producing a voltage in the secondary winding 123. When both primary windings 124 and 125 are energized, the voltage produced by the secondary winding 123 is above the upper threshold value so as to be substantially instantaneously change the device 10 from its blocking state to its conducting state for closing the load circuit 103, 104. If however, one or the other or both of the primary windings 124 and 125 are not energized, the voltage produced by the secondary winding 123 is less than the lower threshold value so as to substantially instantaneously change the device 10 from its conducting state to its blocking state to block current flow through the load circuit 103, 104. Thus, the load circuit arrangement of FIG. 28 forms a simple logic circuit, such as an "and" gate circuit, requiring simultaneous energization of both of the primary windings 124 and 125 in order to energize the electrical load 102. Such a circuit is particularly useful in computer devices and the like. If desired, additional primary windings may be provided to require simultaneous energization of all of many primary windings in order to energize the electrical load.

FIG. 29 is a schematic wiring diagram of a typical load circuit arrangement utilizing a mechanism device of the four electrode type as illustrated in FIGS. 12 and 13. Here, the Mechanism device, such as the device 46, is connected in series in the load circuit 103, 104 by the leads 13 and 14. The control leads 48 and 50 of the device 46 are connected to the secondary winding 128 of a transformer 127 having primary windings 129 and 130. The primary winding 129 is connected through a switch 131 to a pair of terminals 132 and 133, which are in turn connected to a voltage source of the same phase as the voltage source applied to the load terminals 100 and 101. The primary winding 130 is connected through a switch 134 to a pair of terminals 133 and 135, which in turn are connected to a voltage source which is of a phase opposite to the phase of the voltage source applied to the load terminals 100 and 101. The switches 131 and 134 are ganged so that when one is closed the other is opened. The voltage applied to the load terminals 100 and 101 is of a value which is less than the upper threshold voltage of the device 46 and more than the lower threshold value of the device 46.

Thus, when the switch 134 is closed and the switch 131 is opened, the voltage applied to the device 46 by the secondary winding 128 of the transformer 127 bucks the voltage applied from the load terminals 100 and 101 to the device 46. As a result, the resultant total voltage applied to the device 46 is less than the lower threshold value, and the device 46 is substantially instantaneously changed from its conducting state to its blocking state for interrupting the flow of current in the load circuit 103, 104. On the other hand, when the switch 131 is closed and switch 134 is opened, the voltage produced by the secondary winding 128 and applied to the device 46 is additive with the voltage applied to the device 46 by the load terminals 100 and 101. As a result, the resultant voltage applied to the device 46 is above the upper threshold value and the device 46 is substantially instantaneously changed from its blocking state to its conducting state to allow current flow through the load circuit 103, 104. Thus, the arrangement of FIG. 29 produces substantially the same results as the arrangement of FIG. 27, but it utilizes a four electrode type of device and an isolated transformer.

FIG. 30 is a partial schematic wiring diagram similar to that of FIG. 29 and illustrates a typical load circuit arrangement utilizing a Mechanism device of the three electrode type illustrated in FIGS. 14 to 17. Here the device, such as the device 51, is connected by leads 13 and 14 in series into the load circuit 103. The primary winding 128 of the transformer is connected to the lead 13 and to the control lead 48. The arrangement of FIG. 30 operates in the same manner as the arrangement of FIG. 29 and, therefore, a further description is not considered necessary.

While the arrangement of FIG. 26 has been described above as a circuit breaker arrangement responding to inabove as a Circuit Breaker arrangement responding to increased load conditions in the load circuit 103, 104 for opening the load circuit upon an increase in load, that arrangement may also be utilized as a Mechanism arrangement for producing the results obtained by the arrangements of FIGS. 27, 29 and 30. In this respect, the device 10, which is connected in series into the load circuit by the leads 13 and 14, is a Mechanism device having an upper voltage threshold value for substantially instantaneously changing the device from its blocking state to its conducting state and a lower voltage threshold value for substantially instantaneously changing the device from its conducting state to its blocking state. Here, the voltage applied to the terminals 100 and 101 is less than the lower threshold value thereof so that the device 10 normally blocks the flow of current through the load circuit 103, 104. When, however, the switch 111, 112 is closed, the resultant voltage applied to the device 10 is above the upper threshold value for substantially instantaneously changing the device 10 from its blocking state to its conducting state. As a result, the mechanism device 10 is switched between its blocking and conducting states by the simple manipulation of the switch 111, 112.

The arrangement of FIG. 26 utilizing the Mechanism device as described immediately above may also operate as a logic circuit similar to FIG. 28 or as a proximity switch circuit. With respect to the logic circuit or "and" gate circuit operation, the transformer 122 of FIG. 28 may be substituted for the transformer 108 of FIG. 26, the secondary winding 123 being included in the load circuit 103, 104 of FIG. 26. In this arrangement, simultaneous energization of the primary windings 124 and 125 would be required to boost the applied voltage above the upper threshold value to fire the device 10 to its conducting state and if either or both of the primary windings 124 and 125 were deenergized, the applied voltage would drop below the lower threshold value to change the device 10 to its blocking state. With respect to the proximity switch circuit operation, the primary winding 109 of the transformer 108 of FIG. 26 would be connected directly to the terminals 100 and 101 and the core construction of the transformer moved to control the coupling between the primary and secondary winding 109 and 110. When the core construction is in a decoupling position, the applied voltage would be less than the lower threshold value, and when the core construction is in a coupling position, the applied voltage would be greater than the upper threshold value. Thus by manipulating the transformer core construction the load circuit 103, 104 may be closed and opened at will, thereby providing a simple and effective proximity switch construction.

FIG. 31 is a schematic wiring diagram of another typical load circuit arrangement utilizing a Mechanism device of the three electrode type as illustrated in FIGS. 14 to 17. Here, the device, such as the device 58 of FIG. 17, is connected by leads 13 and 14 in series into the load circuit 103, 104. The control lead 48 is connected through a resistor 137 and a switch 138 to one end of a secondary winding 139 of a transformer 140, the other end of the secondary winding 139 being connected to the lead 13, but, if desired, it may be connected to the lead 14 instead of the lead 13, either connection providing appropriate operation. The primary winding 141 of the transformer 140 is connected to a suitable A.C. source of the same frequency as the A.C. source for the load circuit 103, 104 and, if desired it may be connected to the same source, the important consideration being that the A.C. signal applied to the leads 48 and 13 is in phase with the A.C. signal applied to the leads 13 and 14 through the load circuit 103, 104. Also, the A.C. signal may be applied to the lead 48 from the lead 13 through a resistor and a switch, the signal being controlled by the switch or by varying the resistance of the resistor. The A.C. voltage applied to the load circuit 103, 104 is below the lower threshold value, as for example 30 volts, and when the switch 138 is in its open position, the device 58 is in its blocking state and no current flows in the load circuit. However, when the switch 138 is closed, an A.C. voltage, as for example 9 volts, is applied through the resistor 137 and the leads 13 and 48 to the device 58, the total effective voltage applied to the device 58 being above the upper threshold value, and, as a result, the device is changed to its conducting state to allow current flow in the load circuit. When the switch 138 is again opened, the device is changed back to its blocking state to interrupt the current flow in the load circuit. Thus, by alternately applying and interrupting the A.C. voltage to the device 58 through the control leads 48 and 13, the device may be changed between its conducting and blocking states for "switching" the current flow in the relatively high voltage load circuit by means of a relatively low voltage control circuit.

As expressed in the forepart of this specification, the current through the Mechanism devices of this invention continues to flow until the instantaneous current reaches substantially zero. Such devices are, therefore, admirably suitable for control devices for controlling load circuits having inductive loads, they preventing the building up of inductive "kicks" and providing "transientless" switching. These devices also are admirably suitable for use as surge suppressors in usual load circuits controlled by other equipment. Here, the Mechanism device is serially connected in the controlled load circuit in parallel with the inductive load, the voltage of the controlled load circuit being less than the lower threshold voltage value of the device, so that the device is normally in its blocking state and does not short out the inductive load. When, however, the controlled load circuit is opened, the voltage produced by the inductive "kick" from the inductive load rises above the upper threshold voltage value of the device to cause the device to "switch" to its conducting state to short out and dissipate this transient voltage and current. When the transient inductive kick disappears, the device "switches" back to its blocking state for normal operation of the controlled load circuit and for further protection against further transient inductive kicks therein.

While for purposes of illustration several forms of this invention have been disclosed, other forms thereof may become apparent to those skilled in the art upon reference to this disclosure and, accordingly, this invention is to be limited only by the scope of the appended claims.

I claim as my invention:

1. A symmetrical current controlling device for an electrical circuit including a mechanism type semiconductor material means and electrodes in non-rectifying contact therewith for connecting the same in series in said electrical circuit, said semiconductor material means being of one conductivity type, said semiconductor material means including means for providing a first condition of relatively high resistance for substantially blocking current therethrough between the electrodes substantially equally in each direction, said semiconductor material means including means responsive to a voltage of at least a threshold value in either direction or alternately in both directions applied to said electrodes for altering said first condition of relatively high resistance of said semiconductor material means for substantially instantaneously providing at least one path through said semi-conductor material means between the electrodes having a second condition of relatively low resistance for conducting current therethrough between the electrodes substantially equally in each direction, said semiconductor material means including means for maintaining said at least one path of said semiconductor material means in its said second relatively low resistance conducting condition and providing a substantially constant ratio of voltage change to current change for conducting current at a substantially constant voltage therethrough between the electrodes which voltage is the same for increase and decrease in current above a minimum current holding value, and providing a voltage drop across said at least one path in its said second relatively low resistance conducting condition which is a minor fraction of the voltage drop across said semiconductor material means in its said first relatively high resistance blocking condition near said threshold voltage value, and said semiconductor material means including means responsive to a decrease in current, through said at least one path in its said second relatively low resistance conducting condition, to a value below said minimum current holding value for immediately causing realtering of said second relatively low resistance conducting condition of said at least one path to said first relatively high resistance blocking condition.

2. A symmetrical current controlling device for an alternating current electrical circuit including a mechanism type semiconductor material means and electrodes in non-rectifying contact therewith for connecting the same in series in said alternating current electrical circuit, said semiconductor material means being of one conducting type, said semiconductor material means including means for providing a first condition of relatively high resistance for substantially blocking the alternating current therethrough between the electrodes substantially equally in both phases of the alternating current, said semiconductor material means including means responsive to an alternating current voltage of at least a threshold value applied to said electrodes for altering said first condition of relatively high resistance of said semiconductor material means for substantially instantaneously providing at least one path through said semiconductor material means between the electrodes having a second condition of relatively low resistance for conducting the alternating current therethrough substantially equally in each phase of the alternating current, said semiconductor material means including means for maintaining said at least one path of said semiconductor material means in its said second relatively low resistance conducting condition and providing a substantially constant ratio of voltage change to current change for conducting current at a substantially constant voltage therethrough between the electrodes substantially equally in each phase of the alternating current which voltage is the same for increase and decrease in the instantaneous current above a minimum instantaneous current holding value, and providing a voltage drop across said at least one path in its said second relatively low resistance conducting condition which is a minor fraction of the voltage drop across said semiconductor material means in its said first relatively high resistance blocking condition near said threshold voltage value, and said semiconductor material means including means responsive to a decrease in the instantaneous current, through said at least one path in its said relatively low resistance conducting condition, to a value below said minimum instantaneous current holding value in each phase of the alternating current for immediately causing realtering of said second relatively low resistance conducting condition of said at least one path to said first relatively high resistance blocking condition in each phase of the alternating current for substantially blocking the alternating current therethrough substantially equally in each phase of the alternating current.

3. A symmetrical current controlling device for an alternating current electrical circuit as defined in claim 2 wherein said aforementioned means of said semiconductor material means continue the aforesaid alteration of said first relatively high resistance blocking condition of said semiconductor material means and the aforesaid realteration of said second relatively low resistance conducting condition of said at least one path through said semiconductor material means during each phase of the alternating current voltage so long as the alternating current voltage remains above a lower threshold value.

4. A symmetrical current controlling device as defined in claim 2 wherein said semiconductor material means includes means for increasing the resistance of the relatively low resistance conducting condition in response to the application of a direct current bias to said electrodes while the alternating current voltage is being applied thereto to provide an intermediate resistance condition, and for maintaining said intermediate resistance condition upon removal of the alternating current voltage and the direct current bias.

5. A symmetrical current controlling device as defined in claim 2 wherein said semiconductor material means includes means for decreasing and increasing the threshold voltage value in response to increase and decrease respectively in the temperature of the device.

6. A symmetrical current controlling device as defined in claim 1 wherein said semiconductor material means includes means for preventing substantial changes in the threshold voltage value upon usual changes in temperature conditions encountered in the normal operation of the device.

7. A symmetrical current controlling device as defined in claim 1 wherein said first relatively high resistance blocking condition is substantially a crystalline condition.

8. A symmetrical current controlling device as defined in claim 1 wherein said first relatively high resistance blocking condition is substantially a disordered generally amorphous condition.

9. A symmetrical current controlling device as defined in claim 1 wherein said semiconductor material means comprises essentially a thin film.

10. A symmetrical current controlling device as defined in claim 1 wherein said semiconductor material means comprises essentially a thick bulk body.

11. A symmetrical current controlling device as defined in claim 1 wherein said semiconductor material means includes a material comprising tellurium, selenium, sulphur or oxygen and a material comprising a metal, metalloid, intermetallic compound or semiconductor or combinations thereof.

12. A symmetrical current controlling device as defined in claim 1 wherein said semiconductor material means comprises a composition including tellurium as an essential ingredient.

13. A symmetrical current controlling device as defined in claim 1 wherein said semiconductor material comprises a composition including as an essential ingredient tellurium, selenium, sulphur, oxygen, germanium, arsenic, gallium, silicon, indium, antimony, aluminum, or combinations thereof.

14. A symmetrical current controlling device for an electrical circuit including a mechanism type semiconductor material means and electrodes in non-rectifying contact therewith for connecting the same in series in said electrical circuit, said semiconductor material means being of one conductivity type, said semiconductor material means including means for providing a first condition of relatively high resistance for substantially blocking current therethrough between the electrodes substantially equally in each direction, said semiconductor material means including means responsive to a voltage of at least a threshold value in either direction or alternately in both directions applied to said electrodes for altering said first condition of relatively high resistance of said semiconductor material means for substantially instantaneously providing at least one path through said semiconductor material means between the electrodes having a second condition of relatively low resistance for conducting current therethrough between the electrodes substantially equally in each direction, said semiconductor material means including means for maintaining said at least one path of said semiconductor material means in its said second relatively low resistance conducting condition and providing a substantially constant ratio of voltage change to current change for conducting current at a substantially constant voltage therethrough between the electrodes which voltage is the same for increase and decrease in current above a minimum current holding value, and providing a voltage drop across said at least one path in its said second relatively low resistance conducting condition which is a minor fraction of the voltage drop across said semiconductor material means in its said first relatively high resistance blocking condition near said threshold voltage value, and said semiconductor material means including means responsive to a decrease in current, through said at least one path in its said second relatively low resistance conducting condition, to a value below said minimum current holding value for immediately causing realtering of said second relatively low resistance conducting condition of said at least one path to said first relatively high resistance blocking condition, means for applying to said electrodes a voltage of at least said threshold value, which voltage may be in either direction or alternately in both directions, for altering said first relatively high resistance blocking condition to said second relatively low resistance conducting condition, and means for decreasing said voltage applied to said electrodes for decreasing the current to a value below said minimum current holding value for realtering said second relatively low resistance conducting condition to said first relatively high resistance blocking condition.

15. A symmetrical current controlling device for an alternating current electrical circuit including a mechanism type semiconductor material means and electrodes in non-rectifying contact therewith for connecting the same in series in said alternating current electrical circuit, said semiconductor material means being of one conducting type, said semiconductor material means including means for providing a first condition of relatively high resistance for substantially blocking the alternating current therethrough between the electrodes substantially equally in both phases of the alternating current, said semiconductor material means including means responsive to an alternating current voltage of at least a threshold value applied to said electrodes for altering said first condition of relatively high resistance of said semiconductor material means for substantially instantaneously providing at least one path through said semiconductor material means between the electrodes having a second condition of relatively low resistance for conducting the alternating current therethrough substantially equally in each phase of the alternating current, said semiconductor material means including means for maintaining said at least one path of said semiconductor material means in its said second relatively low resistance conducting condition and providing a substantially constant ratio of voltage change to current change for conducting current at a substantially constant voltage therethrough between the electrodes substantially equally in each phase of the alternating current which voltage is the same for increase and decrease in the instantaneous current above a minimum instantaneous current holding value, and providing a voltage drop across said at least one path in its said second relatively low resistance conducting condition which is a minor fraction of the voltage drop across said semiconductor material means in its said first relatively high resistance blocking condition near said threshold voltage value, and said semiconductor material means including means responsive to a decrease in the instantaneous current, through said at least one path in its said relatively low resistance conducting condition, to a value below said minimum instantaneous current holding value in each phase of the alternating current for immediately causing realtering of said second relatively low resistance conducting condition of said at least one path to said first relatively high resistance blocking condition in each phase of the alternating current for substantially blocking the alternating current therethrough substantially equally in each phase of the alternating current, means for applying to said electrodes an alternating current voltage of at least said threshold value for altering said first relatively high resistance blocking condition to said second relatively low resistance conducting condition and for realtering said second relatively low resistance conducting condition to said first relatively high resistance blocking condition during each phase of the alternating current voltage.

16. A symmetrical current controlling device for an alternating current electrical circuit including a mechanism type semiconductor material means and electrodes in non-rectifying contact therewith for connecting the same in series in said alternating current electrical circuit, said semiconductor material means being of one conducting type, said semiconductor material means including means for providing a first condition of relatively high resistance for substantially blocking the alternating current therethrough between the electrodes substantially equally in both phases of the alternating current, said semiconductor material means including means responsive to an alternating current voltage of at least a threshold value applied to said electrodes for altering said first condition of relatively high resistance of said semiconductor material means for substantially instantaneously providing at least one path through said semiconductor material means between the electrodes having a second condition of relatively low resistance for conducting the alternating current therethrough substantially equally in each phase of the alternating current, said semiconductor material means including means for maintaining said at least one path of said semiconductor material means in its said second relatively low resistance conducting condition and providing a substantially constant ratio of voltage change to current change for conducting current at a substantially constant voltage therethrough between the electrodes substantially equally in each phase of the alternating current which voltage is the same for increase and decrease in the instantaneous current above a minimum instantaneous current holding value, and providing a voltage drop across said at least one path in its said second relatively low resistance conducting condition which is a minor fraction of the voltage drop across said semiconductor material means in its said first relatively high resistance blocking condition near said threshold voltage value, and said semiconductor material means including means responsive to a decrease in the instantaneous current, through said at least one path in its said relatively low resistance conducting condition, to a value below said minimum instantaneous current holding value in each phase of the alternating current for immediately causing realtering of said second relatively low resistance conducting condition of said at least one path to said first relatively high resistance blocking condition in each phase of the alternating current for substantially blocking the alternating current therethrough substantially equally in each phase of the alternating current, said aforementioned means of said semiconductor material means cont nuing the aforesaid alteration of said first relatively high resistance blocking condition of said semiconductor material means and the aforesaid realteration of said second relatively low resistance conducting condition of said at least one path through said semiconductor material means during each phase of the alternating current voltage so long as the alternating current voltage remains above a lower threshold value, and means for applying to said electrodes an alternating current voltage of at least said threshold value for altering said first relatively high resistance blocking condition to said second relatively low resistance conducting condition and for realtering sad second relatively low resistance conducting condition to said first relatively high resistance blocking condition during each phase of the alternating current voltage.

17. A symmetrical current controlling device for an electrical circuit including a memory type semiconductor material means and electrodes in non-rectifying contact therewith for connecting the same in series in said electrical circuit, said semiconductor material means including means for providing a first condition which is substantially a disordered generally amorphous condition of relatively high resistance for substantially blocking current therethrough between the electrodes substantially equally in each direction, said semiconductor material means including means responsive to a voltage of at least a threshold value in either direction or alternately in both directions applied to said electrodes for altering said first condition of relatively high resistance of said semiconductor material means for substantially instantaneously providing at least one path through said semiconductor material means between the electrodes having a second condition which is substantially a more ordered crystalline like condition of relatively low resistance for conducting current therethrough between the electrodes substantially equally in each direction, said semiconductor material means including means for maintaining said at least one path of said semiconductor material means in its said second relatively low resistance conducting condition even in the absence of current, said semiconductor material means including means responsive to a current pulse of at least a threshold value in either direction or alternately in both directions applied to said electrodes for substantially instantaneously realtering said second relatively low resistance conducting condition of said at least one path to said first relatively high resistance blocking condition, whereby said semiconductor material means assures reversibility between the aforesaid alteration of said first relatively high resistance blocking condition of said semiconductor material means and the aforesaid realteration of said second relatively low resistance conducting condition of said at least one path through said semiconductor material means.

18. A symmetrical current controlling device for an electrical circuit including a memory type semiconductor material means and electrodes in non-rectifying contact therewith for connecting the same in series in said electrical circuit, said semiconductor material means including means for providing a first condition which is substantially a disordered generally amorphous condition of relatively high resistance for substantially blocking current therethrough between the electrodes substantially equally in each direction, said semiconductor material means including means responsive to a voltage of at least a threshold value in either direction or alternately in both directions applied to said electrodes for altering said first condition of relatively high resistance of said semiconductor material means for substantially instantaneously providing at least one path through said semiconductor material means between the electrodes having a second condition which is substantially a more ordered crystalline like condition of relatively low resistance for conducting current therethrough between the electrodes substantially equally in each direction, said semiconductor material means including means for maintaining said at least one path of said semiconductor material means in its said second relatively low resistance conducting condition even in the absence of current, and providing for conducting current at a substantially constant voltage therethrough between the electrodes for currents above a determinable current value and for conducting current substantially ohmically therethrough between the electrodes for currents below said determinable current value, said semiconductor material means including means responsive to a current pulse of at least a threshold value in either direction or alternately in both directions applied to said electrodes for substantially instantaneously realtering said second relatively low resistance conducting condition of said at least one path to said first relatively high resistance blocking condition, whereby said semiconductor material means assures reversibility between the aforesaid alteration of said first relatively high resistance blocking condition of said semiconductor material means and the aforesaid realteration of said second relatively low resistance conducting condition of said at least one path through said semiconductor material means.

19. A symmetrical current controlling device for an electrical circuit including a memory type semiconductor material means and electrodes in non-rectifying contact therewith for connecting the same in series in said electrical circuit, said semiconductor material means including means for providing a first condition which is substantially a disordered generally amorphous condition of relatively high resistance for substantially blocking current therethrough between the electrodes substantially equally in each direction, said semiconductor material means including means responsive to a voltage of at least a threshold value in either direction or alternately in both directions applied to said electrodes for altering said first condition of relatively high resistance of said semiconductor material means for substantially instantaneously providing at least one path through said semiconductor material means between the electrodes having a second condition which is substantially a more ordered crystalline like condition of relatively low resistance for conducting current therethrough between the electrodes substantially equally in each direction, said semiconductor material means including means for maintaining said at least one path of said semiconductor material means in its said second relatively low resistance conducting condition even in the absence of current, said semiconductor material means including means responsive to the application of said electrodes of a current of at least a threshold value at a voltage less than said voltage threshold value in either direction or alternately in both directions for substantially instantaneously realtering said second relatively low resistance conducting condition of said at least one path to said first relatively high resistance blocking condition, whereby said semiconductor material means assures reversibility between the aforesaid alteration of said first relatively high resistance blocking condition of said semiconductor material means and the aforesaid realteration of said second relatively low resistance conducting condition of said at least one path through said semiconductor material means.

20. A symmetrical current controlling device for an electrical circuit including a memory type semiconductor material means and electrodes in non-rectifying contact therewith for connecting the same in series in said electrical circuit, said semiconductor material means including means for providing a first condition which is substantially a disordered generally amorphous condition of relatively high resistance for substantially blocking current therethrough between the electrodes substantially equally in each direction, said semiconductor material means including means responsive to a voltage of at least a threshold value in either direction or alternately in both directions applied to said electrodes for altering said first condition of relatively high resistance of said semiconductor material means for substantially instaneously providing at least one path through said semiconductor material means between the electrodes having a second condition which is substantially a more ordered crystalline like condition of relatively low resistance for conducting current therethrough between the electrodes substantially equally in each direction, said semiconductor material means including means for maintaining said at least one path of said semiconductor material means in its said second relatively low resistance conducting condition even in the absence of current, said semiconductor material means including means responsive to the interruption of a current of at least a threshold value applied to said electrodes in either direction or alternately in both directions for substantially instantaneously realtering said second relatively low resistance conducting condition of said at least one path to said first relatively high resistance blocking condition, whereby said semiconductor material means assures reversibility between the aforesaid alteration of said first relatively high resistance blocking condition of said semiconductor material means and the aforesaid realteration of said second relatively low resistance conducting condition of said at least one path through said semiconductor material means.

21. A symmetrical current controlling device for an alternating current electrical circuit including a memory type semiconductor material means and electrodes in non-rectifying contact therewith for connecting the same in series in said alternating current electrical circuit, said semiconductor material means including means for providing a first condition which is substantially a disordered generally amorphous condition of relatively high resistance for substantially blocking alternating current therethrough between the electrodes substantially equally in both phases of the alternating current, said semiconductor material means including means responsive to a voltage of at least a threshold value in either direction or alternately in both directions applied to said electrodes for altering said first condition of relatively high resistance of said semiconductor material means for substantially instantaneously providing at least one path through said semiconductor material means between the electrodes having a second condition which is substantially a more ordered crystalline like condition of relatively low resistance for conducting current therethrough between the electrodes substantially equally in both phases of the alternating current, said semiconductor material means including means for maintaining said at least one path of said semiconductor material means in its said second relatively low resistance conducting condition even in the absence of current, said semiconductor material means including means responsive to a current pulse of at least a threshold value in either direction or alternately in both directions applied to said electrodes for substantially instantaneously realtering said second relatively low resistance conducting condition of said at least one path to said first relatively high resistance blocking condition, whereby said semiconductor material means assures reversibility between the aforesaid alteration of said first relatively high resistance blocking condition of said semiconductor material means and the aforesaid realteration of said second relatively low resistance conducting condition of said at least one path through said semiconductor material means.

22. A symmetrical current controlling device for an alternating current electrical circuit including a memory type semiconductor material means and electrodes in non-rectifying contact therewith for connecting the same in series in said alternating current electrical circuit, said semiconductor material means including means for providing a first condition which is substantially a disordered generally amorphous condition of relatively high resistance for substantially blocking alternating current therethrough between the electrodes substantially equally in both phases of the alternating current, said semiconductor material means including means responsive to a voltage of at least a threshold value in either direction or alternately in both directions applied to said electrodes for altering said first condition of relatively high resistance of said semiconductor material means for substantially instantaneously providing at least one path through said semiconductor material means between the electrodes having a second condition which is substantially a more ordered crystalline like condition of relatively low resistance for conducting current therethrough between the electrodes substantially equally in both phases of the alternating current, said semiconductor material means including means for maintaining said at least one path of said semiconductor material means in its said second relatively low resistance conducting condition even in the absence of current, said semiconductor material means including means responsive to the application to said electrodes of a current of at least a threshold value at a voltage less than said voltage threshold value in either direction or alternately in both directions for substantially instantaneously realtering said second relatively low resistance conducting condition of said at least one path to said first relatively high resistance blocking condition, whereby said semiconductor material means assures reversibility between the aforesaid alteration of said first relatively high resistance blocking condition of said semiconductor material means and the aforesaid realteration of said second relatively low resistance conducting condition of said at least one path through said semiconductor material means.

23. A symmetrical current controlling device as defined in claim 17 wherein said semiconductor material means comprises essentially a thin film.

24. A symmetrical current controlling device as defined in claim 17 wherein said semiconductor material means comprises a thick bulk body.

25. A symmetrical current controlling device as defined in claim 17 wherein said semiconductor material means, when being altered from said first relatively high resistance blocking condition to said second relatively low resistance conducting condition, is heated to at least a critical transition temperature above which crystallization takes place.

26. A symmetrical current controlling device as defined in claim 17 wherein said semiconductor material means, when being realtered from said second relatively low resistance conducting condition to said first relatively high resistance blocking condition, is heated by the current pulse to disrupt the more ordered crystalline like condition and form the disordered generally amorphous condition.

27. A symmetrical current controlling device as defined in claim 17 wherein said reversible altering and realtering of said semiconductor material means between said first relatively high resistance blocking condition and said second relatively low resistance conducting condition are caused by changes in the internal thermodynamic conditions in said semiconductor material means.

28. A symmetrical current controlling device as defined in claim 17 wherein said semiconductor material means includes means for further decreasing the resistance of the relatively low resistance conducting condition in response to increased electrical power applied by voltages of at least said threshold value and for further increasing the resistance of the relatively high resistance blocking condition in response to applied currents greater than said current threshold value.

29. A symmetrical current controlling device for an electrical circuit including a memory type semiconductor material means and electrodes in on-rectifying contact therewith for connecting the same in series in said electrical circuit, said semiconductor material means including means for providing a first condition which is substantially a disordered generally amorphous condition of relatively high resistance for substantially blocking current therethrough between the electrodes substantially equally in each direction, said semiconductor material means including means responsive to a voltage of at least a threshold value in either direction or alternately in both directions applied to said electrodes for altering said first condition of relatively high resistance of said semiconductor material means for substantially instantaneously providing at least one path through said semiconductor material means between the electrodes having a second condition which is substantially a more ordered crystalline like condition of relatively low resistance for conducting current therethrough between the electrodes substantially equally in each direction, said semiconductor material means including means for maintaining said at least one path of said semiconductor material means in its said second relatively low resistance conducting condition even in the absence of current, said semiconductor material means including means responsive to a current pulse of at least a threshold value in either direction or alternately in both directions applied to said electrodes for substantially instantaneously realtering said second relatively low resistance conducting condition of said at least one path to said first relatively high resistance blocking condition, whereby said semiconductor material means assures reversibility between the aforesaid alteration of said first relatively high resistance blocking condition of said semiconductor material means and the aforesaid realteration of said second relatively low resistance conducting condition of said at least one path through said semiconductor material means, means for applying to said electrodes a voltage of at least said voltage threshold value, which voltage may be in either direction or alternately in both directions, for altering said first relatively high resistance blocking condition to said second relatively low resistance conducting condition, and means for applying to said electrodes a current pulse of at least said current threshold value, which current pulse may be in either direction or alternately in both directions, for realtering said second relatively low resistance conducting condition to said first relatively high resistance blocking condition.

30. A symmetrical current controlling device for an electrical circuit including a memory type semiconductor material means and electrodes in non-rectifying contact therewith for connecting the same in series in said electrical circuit, said semiconductor material means including means for providing a first condition which is substantially a disordered generally amorphous condition of relatively high resistance for substantially blocking current therethrough between the electrodes substantially equally in each direction, said semiconductor material means including means responsive to a voltage of at least a threshold value in either direction or alternately in both directions applied to said electrodes for altering said first condition of relatively high resistance of said semiconductor material means for substantially instantaneously providing at least one path through said semiconductor material means between the electrodes having a second condition which is substantially a more ordered crystalline like condition of relatively low resistance for conducting current therethrough between the electrodes substantially equally in each direction, said semiconductor material means including means for maintaining said at least one path of said semiconductor material means in its said second relatively low resistance conducting condition even in the absence of current, said semiconductor material means including means responsive to the application to said electrodes of a current of at least a threshold value at a voltage less than said voltage threshold value in either direction or alternately in both directions for substantially instantaneously realtering said second relatively low resistance conducting condition of said at least one path to said first relatively high resistance blocking condition, whereby said semiconductor material means assures reversibility between the aforesaid alteration of said first relatively high resistance blocking condition of said semiconductor material means and the aforesaid realteration of said second relatively low resistance conducting condition of said at least one path through said semiconductor material means, means for applying to said electrodes a voltage of at least said voltage threshold value, which voltage may be in either direction or alternately in both directions, for altering said first relatively high resistance blocking condition to said second relatively low resistance conducting condition, and means for applying to said electrodes a current of at least said current threshold value at a voltage less than said voltage threshold value, which current may be in either direction or alternately in both directions, for realtering said second relatively low resistance conducting condition to said first relatively high resistance blocking condition.

31. A symmetrical current controlling device for an electrical circuit including a memory type semiconductor material means and electrodes in non-rectifying contact therewith for connecting the same in series in said electrical circuit, said semiconductor material means including means for providing a first condition which is substantially a disordered generally amorphous condition of relatively high resistance for substantially blocking current therethrough between the electrodes substantially equally in each direction, said semiconductor material means including means responsive to a voltage of at least a threshold value in either direction or alternately in both directions applied to said electrodes for altering said first condition of relatively high resistance of said semiconductor material means for substantially instantaneously providing at least one path through said semiconductor material means between the electrodes having a second condition which is substantially a more ordered crystalline like condition of relatively low resistance for conducting current therethrough between the electrodes substantially equally in each direction, said semiconductor material means including means for maintaining said at least one path of said semiconductor material means in its said second relatively low resistance conducting condition even in the absence of current, said semiconductor material means including means responsive to the interruption of a current of at least a threshold value applied to said electrodes in either direction or alternately in both directions for substantially instantaneously realtering said second relatively low resistance conducting condition of said at least one path to said first relatively high resistance blocking condition, whereby said semiconductor material means assures reversibility between the aforesaid alteration of said first relatively high resistance blocking condition of said semiconductor material means and the aforesaid realteration of said second relatively low resistance conducting condition of said at least one path through said semiconductor material means, means for applying to said electrodes a voltage of at least said voltage threshold value, which voltage may be in either direction or alternately in both directions, for altering said first relatively high resistance blocking condition to said second relatively low resistance conducting condition, and means for interrupting a current of at least said current threshold value applied to said electrodes, which current may be in either direction or alternately in both directions, for realtering said second relatively low resistance conducting condition to said first relatively high resistance blocking condition.

32. A symmetrical current controlling device for an alternating current electrical circuit including a memory type semiconductor material means and electrodes in nonrectifying contact therewith for connecting the same in series in said alternating current electrical circuit, said semiconductor material means including means for providing a first condition which is substantially a disordered generally amorphous condition of relatively high resistance for substantially blocking alternating current therethrough between the electrodes substantially equally in both phases of the alternating current, said semiconductor material means including means responsive to a voltage of at least a threshold value in either direction or alternately in both directions applied to said electrodes for altering said first condition of relatively high resistance of said semiconductor material means for substantially instantaneously providing at least one path through said semiconductor material means between the electrodes having a second condition which is substantially a more ordered crystalline like condition of relatively low resistance for conducing current therethrough between the electrodes substantially equally in both phases of the alternating current, said semiconductor material means including means for maintaining said at least one path of said semiconductor material means in its said second relatively low resistance conducting condition even in the absence of current, said semiconductor material means including means responsive to a current pulse of at least a threshold value in either direction or alternately in both directions applied to said electrodes for substantially instantaneously realtering said second relatively low resistance conducting condition of said at least one path to said first relatively high resistance blocking condition, whereby said semiconductor material means assures reversibility between the aforesaid alteration of said first relatively high resistance blocking condition of said semiconductor material means and the aforesaid realteration of said second relatively low resistance conducting condition of said at least one path through said semiconductor material means, means for applying to said electrodes a voltage of at least said voltage threshold value, which voltage may be in either direction or alternately in both directions, for altering said first relatively high resistance blocking condition to said second relatively low resistance conducting condition, and means for applying to said electrodes a current pulse of at least said current threshold value, which current pulse may be in either direction or alternately in both directions, for realtering said second relatively low resistance conducting condition to said first relatively high resistance blocking condition.

33. A symmetrical current controlling device for an alternating current electrical circuit including a memory type semiconductor material means and electrodes in nonrectifying contact therewith for connecting the same in series in said alternating current electrical circuit, said semiconductor material means including means for providing a first condition which is substantially a disordered generally amorphous condition of relatively high resistance for substantially blocking alternating current therethrough between the electrodes substantially equally in both phases of the alternating current, said semiconductor material means including means responsive to a voltage of at least a threshold value in either direction or alternately in both directions applied to said electrodes for altering said first condition of relatively high resistance of said semiconductor material means for substantially instantaneously providing at least one path through said semiconductor material means between the electrodes having a second condition which is substantially a more ordered crystalline like condition of relatively low resistance for conducting current therethrough between the electrodes substantially equally in both phases of the alternating current, said semiconductor material means including means for maintaining said at least one path of said semiconductor material means in its said second relatively low resistance conducting condition even in the absence of current, said semiconductor material means including means responsive to the application to said electrodes of a current of at least a threshold value at a voltage less than said voltage threshold value in either direction or alternately in both directions for substantially instantaneously realtering said second relatively low resistance conducting condition of said at least one path to said first relatively high resistance blocking condition, whereby said semiconductor material means assures reversibility between the aforesaid alteration of said first relatively high resistance blocking condition of said semiconductor material means and the aforesaid realteration of said second relatively low resistance conducting condition of said at least one path through said semiconductor material means, means for applying to said electrodes a voltage of at least said voltage threshold value, which voltage may be in either direction or alternately in both directions, for altering said first relatively high resistance blocking condition to said second relatively low resistance conducting condition, and means for applying to said electrodes a current of at least said current threshold value at a voltage less than said voltage threshold value, which current may be in either direction or alternately in both directions, for realtering said second relatively low resistance conducting condition to said first relatively high resistance blocking condition.

(References on following page)

References Cited by the Examiner

UNITED STATES PATENTS

| | | | |
|---|---|---|---|
| 1,751,361 | 3/1930 | Ruben | 317—237 |
| 2,032,439 | 3/1936 | Ruben | 317—237 |
| 2,208,455 | 7/1940 | Glaser | 317—234 |
| 2,847,335 | 8/1958 | Gremmelmaier | 317—235 |
| 2,865,793 | 12/1958 | Nobel | 317—237 |

| | | | |
|---|---|---|---|
| 2,865,794 | 12/1958 | Kroger | 317—237 |
| 3,018,312 | 1/1962 | Cornish | 252—62.3 |

OTHER REFERENCES

Electronics, vol. 32, No. 29, July 17, 1959, pages 43–47.

JOHN W. HUCKERT, *Primary Examiner.*

J. D. KALLAM, *Assistant Examiner.*

UNITED STATES PATENT OFFICE

CERTIFICATE OF CORRECTION

Patent No. 3,271,591 September 6, 1966

Stanford R. Ovshinsky

It is hereby certified that error appears in the above numbered patent requiring correction and that the said Letters Patent should read as corrected below.

Column 1, line 34, before "non-" insert -- in --; column 2, line 30, for "have" read -- having --; column 4, line 64, after "least" insert -- a --; column 6, line 60, strike out "which may change in structure and which have"; column 11, line 22, strike out "possibly may contain relatively large" and insert instead -- may be caused by dipole movement and --; column 13, line 7, after "toward" insert -- which --; column 20, line 18, for "may be so formed, they are" read -- are so formed, they may be --; column 31, line 72, strike out "above as a circuit breaker arrangement responding to in-"; column 41, line 46, for "on-rectifying" read -- non-rectifying --.

Signed and sealed this 29th day of August 1967.

(SEAL)
Attest:

ERNEST W. SWIDER
Attesting Officer

EDWARD J. BRENNER
Commissioner of Patents